US 12,384,569 B2

(12) United States Patent
Zou et al.

(10) Patent No.: US 12,384,569 B2
(45) Date of Patent: Aug. 12, 2025

(54) UAV HAVING MULTIFUNCTIONAL LEG ASSEMBLY AND ITS CHARGING SYSTEM

(71) Applicants: Jie-Tong Zou, Yun-Lin Hsien (TW); Jean-Shyan Wang, Yun-Lin Hsien (TW)

(72) Inventors: Jie-Tong Zou, Yun-Lin Hsien (TW); Jean-Shyan Wang, Yun-Lin Hsien (TW)

(73) Assignee: National Formosa University, Yun-Lin Hsien (TW)

( * ) Notice: Subject to any disclaimer, the term of this patent is extended or adjusted under 35 U.S.C. 154(b) by 265 days.

(21) Appl. No.: 18/201,867

(22) Filed: May 25, 2023

(65) Prior Publication Data
US 2024/0002079 A1 Jan. 4, 2024

(30) Foreign Application Priority Data

Jun. 30, 2022 (TW) .................................. 111124612
Oct. 6, 2022 (TW) .................................. 111138074

(51) Int. Cl.
*B64U 50/37* (2023.01)
*B64U 50/31* (2023.01)
(Continued)

(52) U.S. Cl.
CPC ............. *B64U 60/50* (2023.01); *B64U 50/31* (2023.01); *B64U 50/37* (2023.01); *B64U 60/40* (2023.01);
(Continued)

(58) Field of Classification Search
CPC ........ B64U 50/37; B64U 60/40; B64U 60/50; B64U 60/70; B64U 70/90; B64U 70/92; B64U 70/97; B64U 70/99
See application file for complete search history.

(56) References Cited

U.S. PATENT DOCUMENTS

| 9,896,203 B1* | 2/2018 | Kim ...................... B64D 27/24 |
| 11,667,402 B2* | 6/2023 | Liske ..................... B64U 50/37 |
| | | 244/116 |

(Continued)

*Primary Examiner* — Joshua J Michener
*Assistant Examiner* — Colin Zohoor

(57) ABSTRACT

The invention discloses an unmanned aerial vehicle having multifunctional leg assembly and charging system, including unmanned aerial vehicle and charging station. The UAV includes obstacle avoidance sensors, flight control module, first signal processing module, electric undercarriage and power charge/storage module. The charging station includes power charge/supply module. The obstacle avoidance sensors sense obstacles near the UAV to generate obstacle sensing signals. The first signal processing module interprets and processes the obstacle sensing signals to determine whether there is an obstacle near the UAV, and when the judgment result is yes, an avoidance instruction is transmitted to the flight control module, so that the flight control module drives the UAV to avoid the obstacle. The electric undercarriage includes first leg frame, second leg frame and electric driving mechanism. The electric driving mechanism drives the first leg frame and the second leg frame to fold and unfold alternately. The power charge/storage module includes first positive electrode and first negative electrode. The charging station includes power charge/supply module. The power charge/supply module includes second positive electrode and second negative electrode. When the UAV parks on a platform of the charging station, and the first positive electrode and the first negative electrode are in contact with the second positive electrode and the second negative electrode, then the power charge/supply module charges electricity to the power charge/storage module.

18 Claims, 15 Drawing Sheets

(51) Int. Cl.
*B64U 60/40* (2023.01)
*B64U 60/50* (2023.01)
*B64U 70/90* (2023.01)
*G05D 1/00* (2006.01)
*B64U 101/26* (2023.01)
*B64U 101/30* (2023.01)

(52) U.S. Cl.
CPC ............ *B64U 70/90* (2023.01); *G05D 1/106* (2019.05); *B64U 2101/26* (2023.01); *B64U 2101/30* (2023.01); *B64U 2201/104* (2023.01)

(56) References Cited

U.S. PATENT DOCUMENTS

| | | | |
|---|---|---|---|
| 11,713,136 B2* | 8/2023 | Foggia | B64U 80/10 |
| | | | 244/114 R |
| 11,975,821 B2* | 5/2024 | Ishikawa | B64U 60/40 |
| 12,043,421 B2* | 7/2024 | Cevacins | B64U 70/99 |
| 2017/0240062 A1* | 8/2017 | Jaiswal | B64F 1/22 |
| 2021/0031947 A1* | 2/2021 | Wankewycz | B60L 53/36 |
| 2023/0037429 A1* | 2/2023 | Sherman | H04B 5/79 |

* cited by examiner

UAV HAVING MULTIFUNCTIONAL LEG ASSEMBLY AND ITS CHARGING SYSTEM

CROSS REFERENCE TO RELATED APPLICATIONS

This non-provisional application claims priority under 35 U.S.C. 119(a) on Patent Application No. 111124612 and 111138074 respectively filed in Taiwan on Jun. 30, 2022 and 10/06/2022, the entire contents of which are hereby incorporated by reference.

FIELD OF THE INVENTION

The present invention relates to an unmanned aerial vehicle having multifunctional leg assembly and its charging system, especially to one that can avoid obstacles when cruising, and a control technology for charging while the UAV stations.

BACKGROUND OF THE INVENTION

According to what is known, a first conventional way of detecting a bridge's bottom is to manually enter under the bridge to visually detect the bottom of the bridge. When the spacing between the bridge and the water surface is too low, it is impossible to detect the bottom of the bridge easily. As for a second way for detecting bridge's bottom, it is to use a crane with a cage to send the worker to the bottom of the bridge to performance the detection. The second way can be generally used when the spacing between the bridge and the water surface is higher enough, but this way is not only costs higher, and the safety of personnel is also an important problem.

Furthermore, facility inspection is a highly repetitive routine work, many traditional manual inspections are inefficient, high in costs, and have certain safety risks. The thermal imaging and high magnification zoom image capture device mounted on the UAV can replace manual inspection tasks in large areas, long distances, and high risks. It has been widely used in many requirements of industries such as electricity power facility inspections, forest inspections, land surveillance, petroleum pipeline inspection and environmental governance. AI smart inspection drones with aerial inspections technology can be used in the technical fields such as petrochemical plants, power lines, solar panels, wind turbines, bridges, buildings, fire protection and reservoirs, for the search and rescue purposes.

In addition, about more than 40,000 iron and road bridges in Taiwan are in use, and most of them use traditional detection means at present, relying on the naked eye or auxiliary tools (bridge inspection vehicles, binoculars, etc.) to detect whether the bridges have cracks, steel bars are corroded or supports are empty and so on. For bridges with special structures outside the visible range such as the beam bottom plate and tower top lightning rod having many blind spots, it is very difficult to use the current traditional detection way which will result in inefficient, difficult and dangerous.

In order to improve the lack of traditional bridge inspections way, the industry in the related technical field of the present invention has developed a kind of inspection technology that adopts multi-rotor drones and cameras to do bridge inspections. The unmanned aerial vehicle (UAV) has flight module, power module, sensing module, wireless transmission module and global positioning system (GPS), and is equipped with image capture module for predetermined flight shooting work, and use the wireless transmission module to output the shooting images in real time. A remote control module is used to control the UAV and the image capture module to a predetermined bridge to take pictures of the bridge to get bridge images for bridge inspection. A setting module is set in the remote control module and for setting the works of the UAV and the image capture module. The setting module includes task setting mechanism, flight route mechanism, flight data monitoring mechanism, obstacle avoidance mechanism, image switching mechanism, and image detection and analysis mechanism. Although the traditional bridge inspection way has the function of shooting bridge's image to perform bridge inspection by UAV, however, is does not have the functions such as take-off and landing anti-collision settings for the UAV, its UAV has no an anti-collision frame when it is lifted into the air. Once it hits a bridge or a pier, the UAV will be completely destroyed, thus causing property loss. Not only that, but the traditional bridge inspection way also does not have the functions such as bridge fixed-point vibration sensing and sensing data acquisition, uploading, calculation and analysis, which will cause inconvenience and incomplete for the task of the bridge inspection.

SUMMARY OF THE INVENTION

The purpose of the present invention is to provide a UAV system with a multifunctional leg assembly and a charging system, which includes a UAV and a charging station. The settings on the UAV include laser rangefinders, flight control module, first signal processing module, electric undercarriage, and power charge/storage module. The charging station includes a power charge/supply module. The laser rangefinder is used to sense the obstacles near the UAV to generate obstacle sensing signals. The first signal processing module controls the flight control module to drive the UAV to perform inspection flight, and interprets and processes the obstacle sensing signal to determine whether there is an obstacle near the UAV, and when the judgment result is that there is an obstacle, an avoidance instruction is generated and transmitted to the flight control module, so that the flight control module drives the UAV to avoid obstacles. The electric undercarriage includes a first leg frame, a second leg frame and an electric driving mechanism. The electric driving mechanism is used to drive the first leg frame and the second leg frame to alternatively fold and unfold with respect to each other. The power charge/storage module includes a first positive electrode and a first negative electrode. The charging station includes a power charge/supply module. The power charge/supply module includes a second positive electrode and a second negative electrode. When the UAV is parked on a platform of the charging station, and the first positive electrode and the first negative electrode are in contact with the second positive electrode and the second negative electrode, the power charge/supply module passes through the first positive electrode, the first negative electrode, the first negative electrode and the second positive electrode to charge the power charge/storage module.

DETAILED DESCRIPTION OF THE PREFERRED EMBODIMENT

Figure 1:
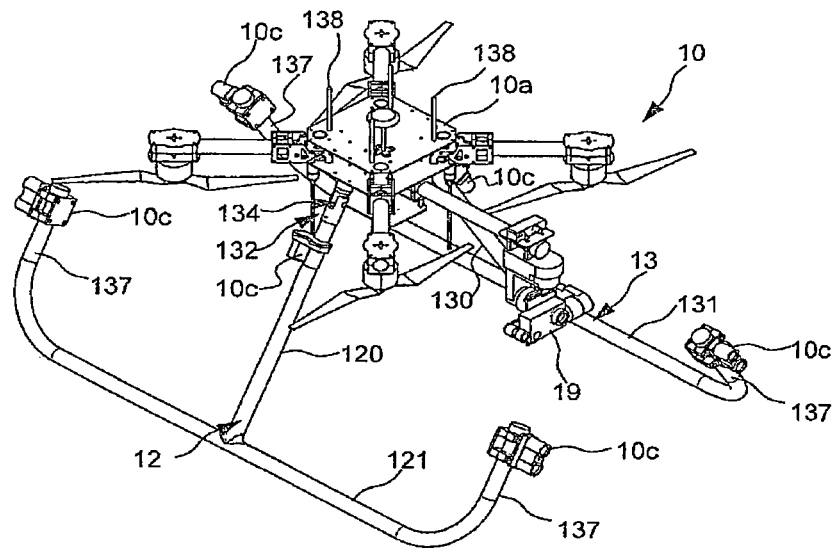
FIG. 1 is the schematic diagram of the electric undercarriage as landing gear for the UAV according to the present invention.
Figure 2:
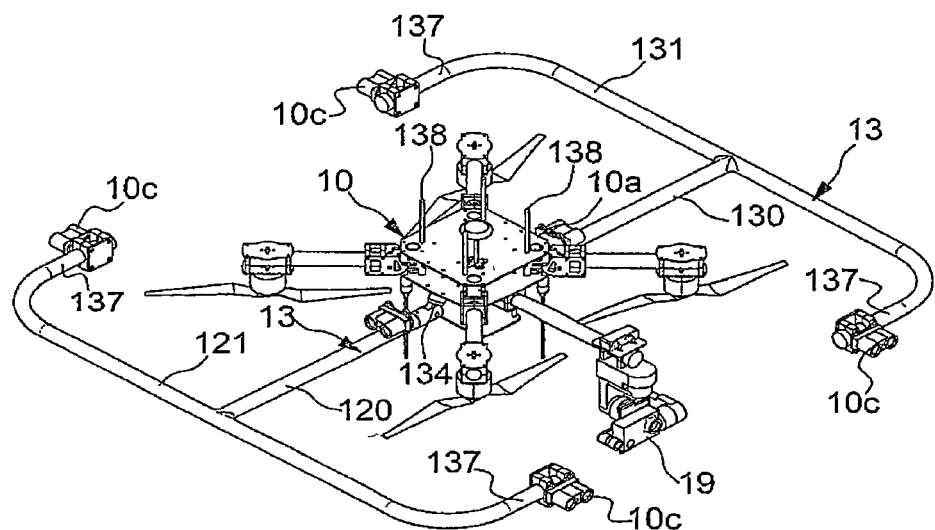
FIG. 2 is the schematic diagram of the electric undercarriage as anti-collision frame for the UAV according to the present invention.
Figure 3:
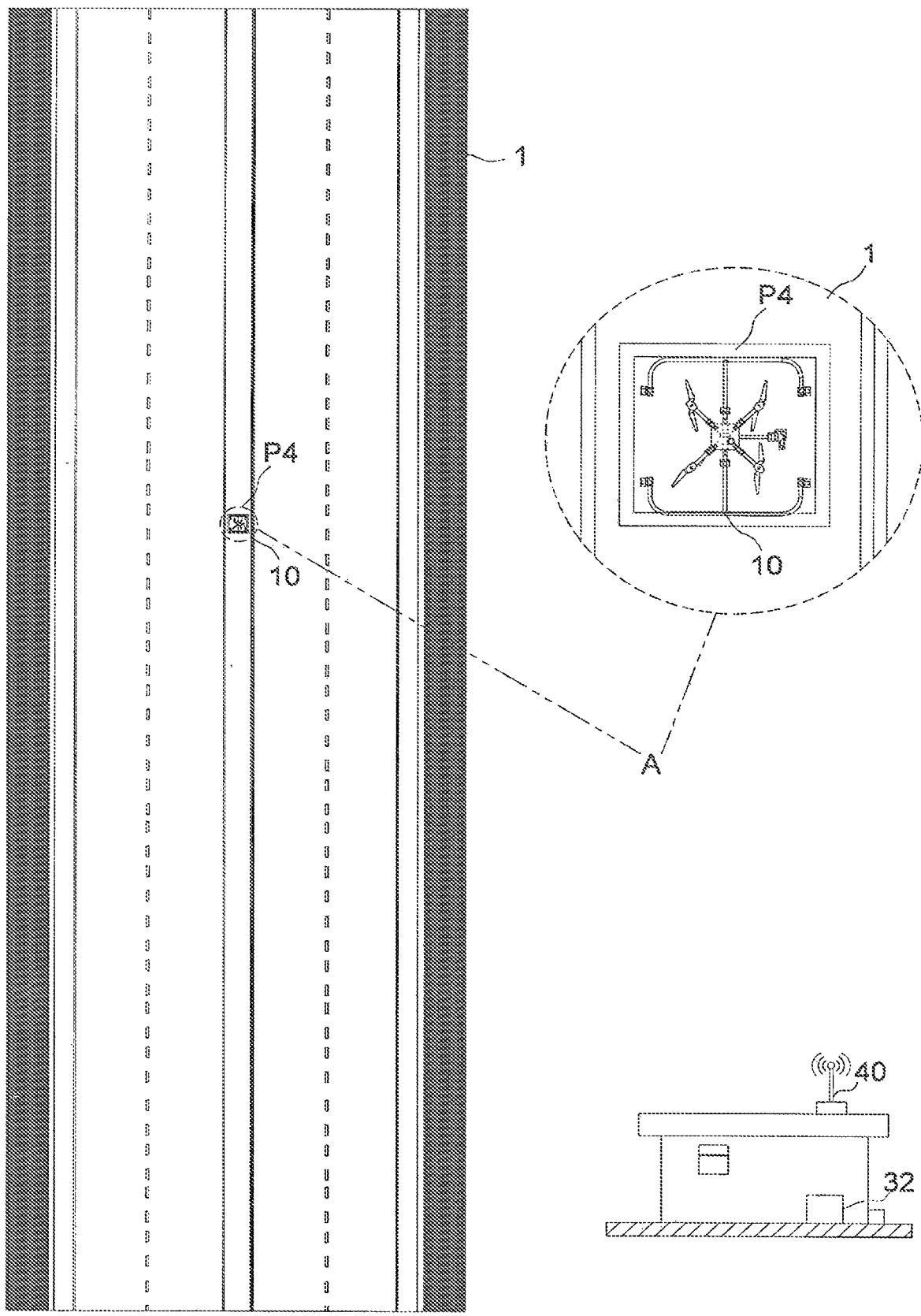
FIG. 3 is a schematic diagram of the first application implementation of the present invention.
Figure 4:
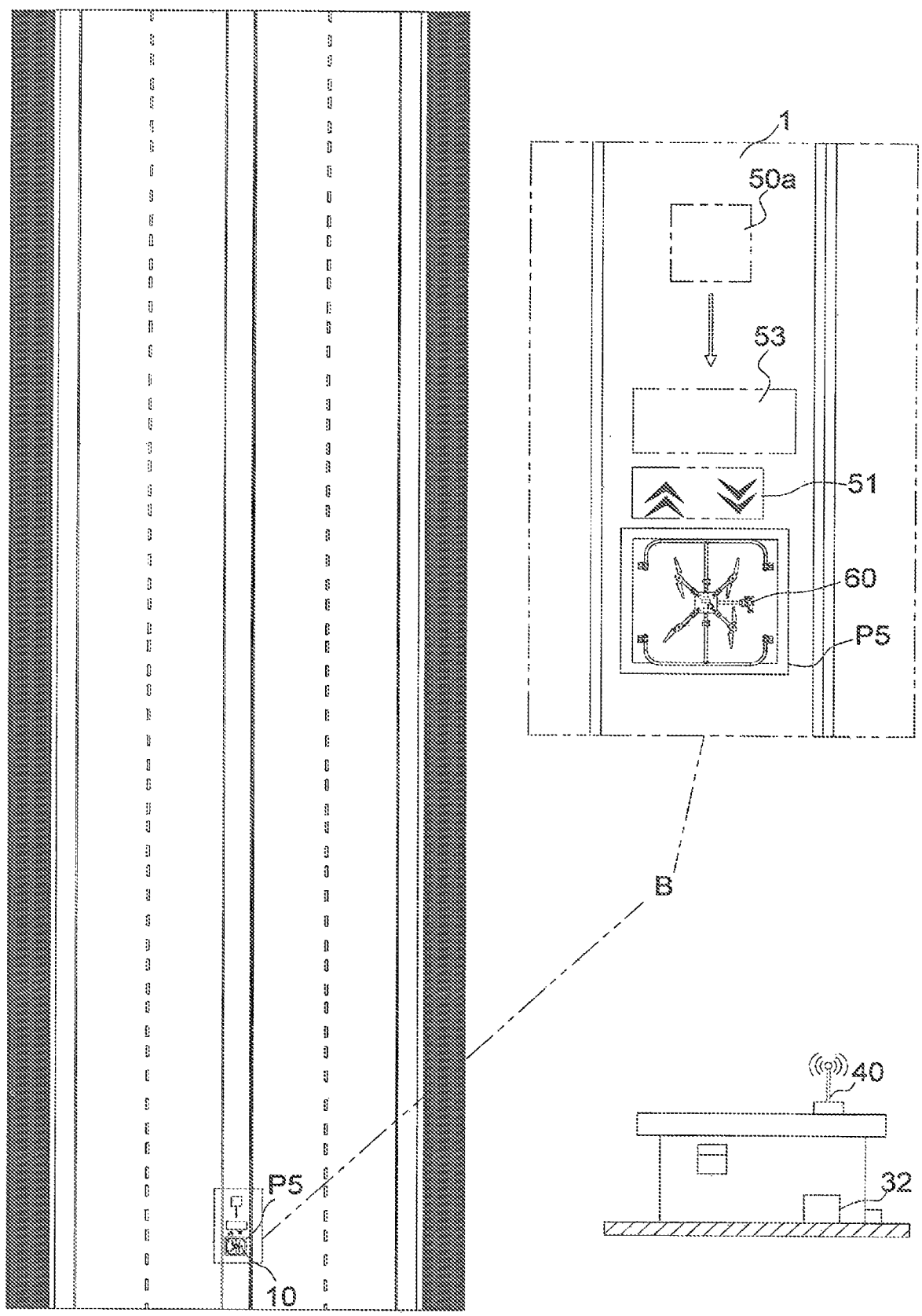
FIG. 4 is a schematic diagram of the second application implementation of the present invention.
Figure 8:
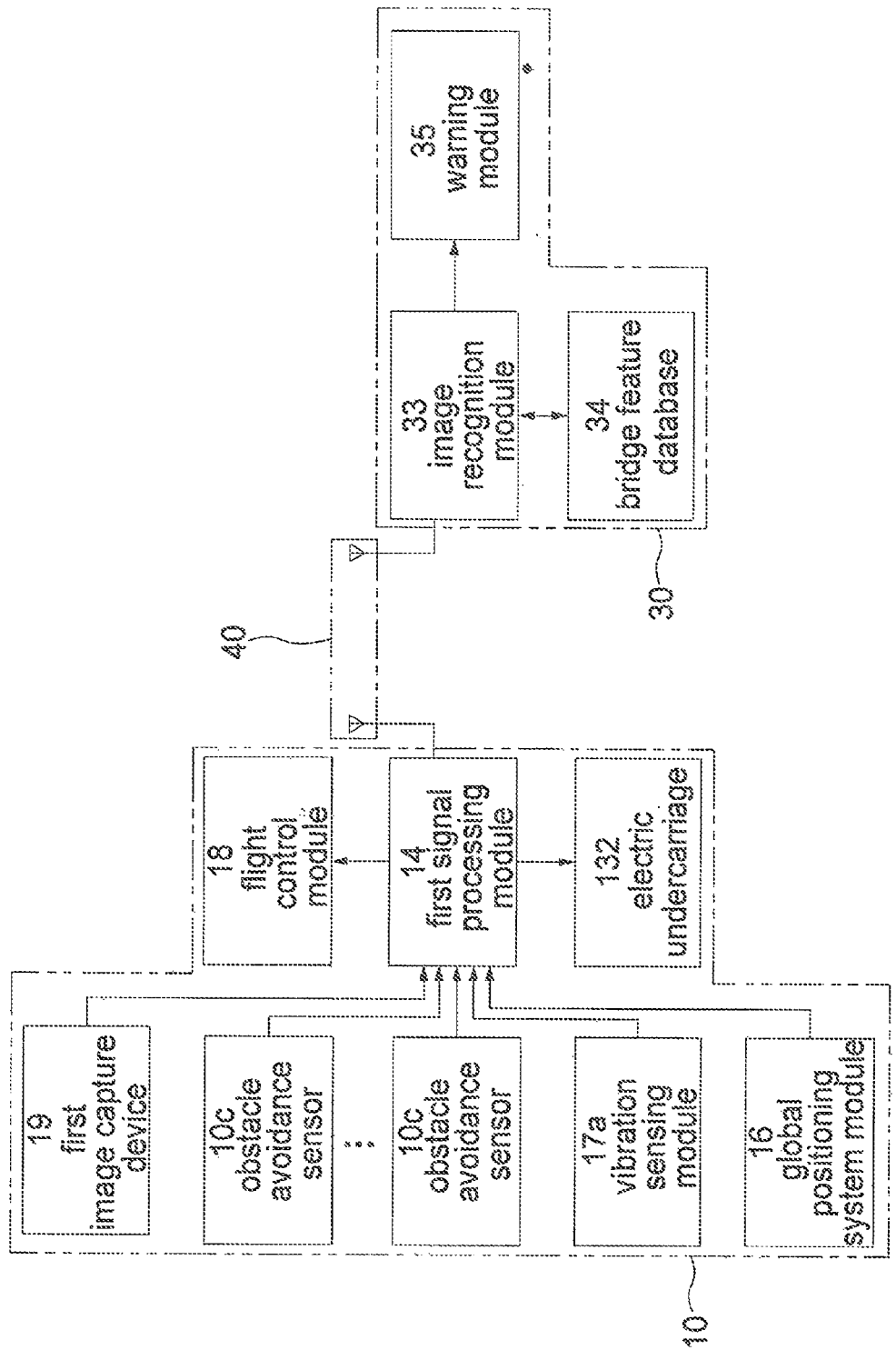
FIG. 8 is a schematic functional grid diagram of one specific implementation architecture according to the present invention.

Referring to FIGS. 1-2 and FIG. 8, the UAV 10 (Unmanned Aerial Vehicle) of the present invention is applied for a bridge inspection system. The UAV 10 is equipped with a plurality of obstacle avoidance sensors 10c, a flight control module 18, a first signal processing module 14 and an electric undercarriage 132. The plurality of obstacle avoidance sensors 10c are used to sense the obstacles near the UAV 10 to generate obstacle sensing signals. The first signal processing module 14 produces flight control signals for the flight control module 18 by a remote control command or an automatic navigation command, so that the flight control module 18 drives the UAV 10 to perform the bridge inspection flights. The first signal processing module 14 interprets and processes the obstacle sensing signals, then judges whether there are obstacles in the vicinity of the UAV 10. If the judgment result is yes, i.e. is that there are obstacles, the first signal processing module 14 generates an avoidance command and transmits the avoidance command to the flight control module 18, and according to the avoidance command the flight control module 18 drives the UAV 10 to perform an avoidance flight to avoid the obstacles near the UAV 10. The electric undercarriage 132 includes an electric driving mechanism 134, and a first leg frame 12 and a second leg frame 13 rotatably pivoted on two opposite sides of the body 10a of the UAV 10. The electric driving mechanism 134 configured to be controlled by the first signal processing module 14 to drive the first leg frame 12 and the second leg frame 13 to perform relative folding and unfolding actions alternatively. When the UAV 10 is to land, the electric driving mechanism 134 drives the first leg frame 12 and the second leg frame 13 to perform the folding action to serve as a landing gear for the UAV. When the UAV 10 is lifted into the air, the electric driving mechanism 134 drives the first leg frame 12 and the second leg frame 13 to perform the unfolding action to serve as an anti-collision frame for the UAV.

Referring to FIGS. 1-2 and FIG. 8, the plurality of obstacle avoidance sensors 10c are six laser rangefinders (such as LIDAR). The first leg frame 12 includes a first bottom bar 121 and a first bracket 120 connected to a middle section of the first bottom bar 121. The second leg frame 13 includes a second bottom bar 131 and a second bracket 130 connected to a middle section of the second bottom bar 131. Two ends of the first bottom bar 121 and the second bottom bar 131 are respectively extended with a bending bar 137 bent toward the UAV 10, i.e. the corresponding bending bars 137 of the first bottom bar 121 and the second bottom bar 131 directing to each other when the first leg frame 12 and the second leg frame 13 serve as the anti-collision frame. Two laser rangefinders are arranged on the two bending bars 137 at the front ends of the first bottom bar 121 and the second bottom bar 131 to sense obstacles in a front space of the UAV 10. Two laser rangefinders are arranged on the second bent section 137 at the rear ends of the first bottom bar 121 and the second bottom bar 131 to sense obstacles in a rear space of the UAV 10. Two laser rangefinders are arranged at the middle sections of the first base bar 121 and the second base bar 131 for sensing obstacles in two lateral spaces of the UAV 10. Corners of the body 10a are upwardly provided with a plurality of retractable and elastic anti-collision ejector rods 138.

Figure 6:
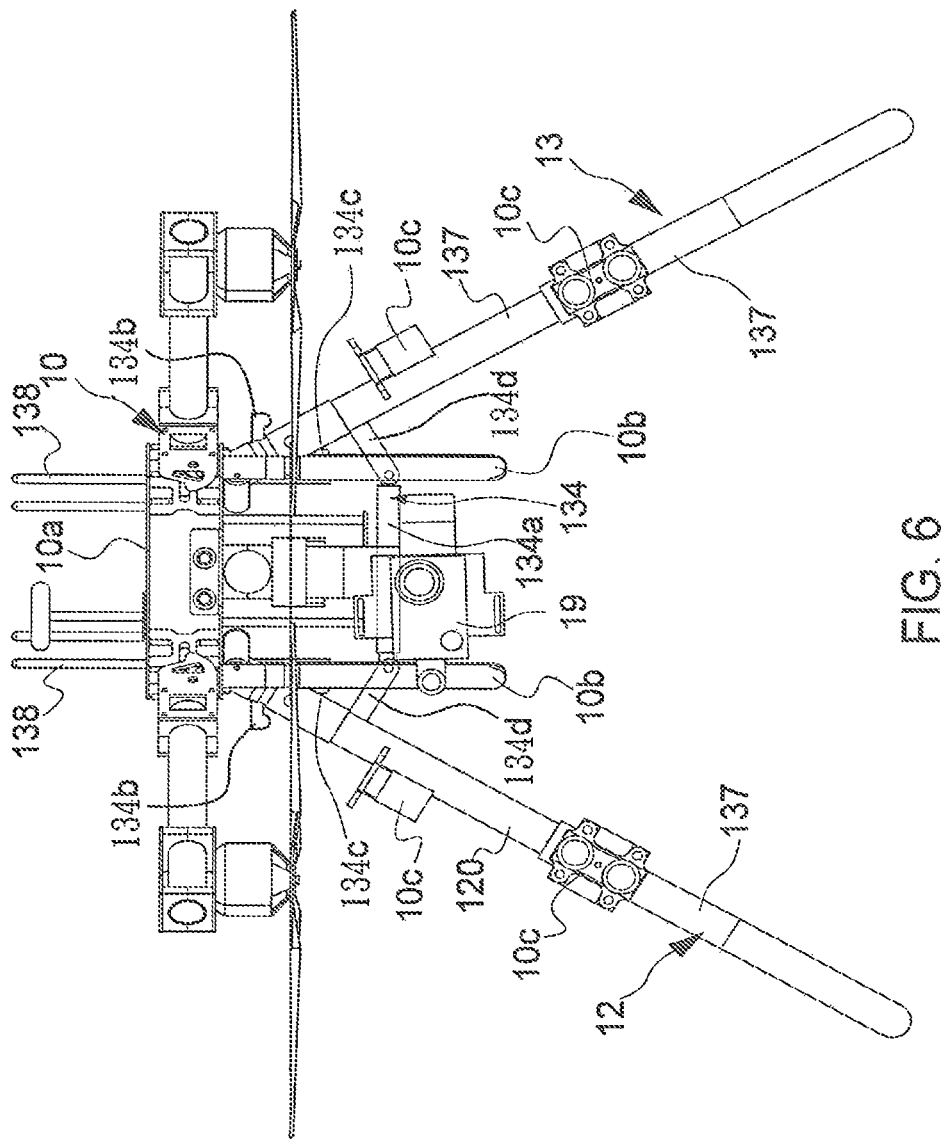
FIG. 6 is a schematic diagram of the electric driving mechanism performing contraction action for the electric undercarriage being a landing gear according to the present invention.
Figure 7:
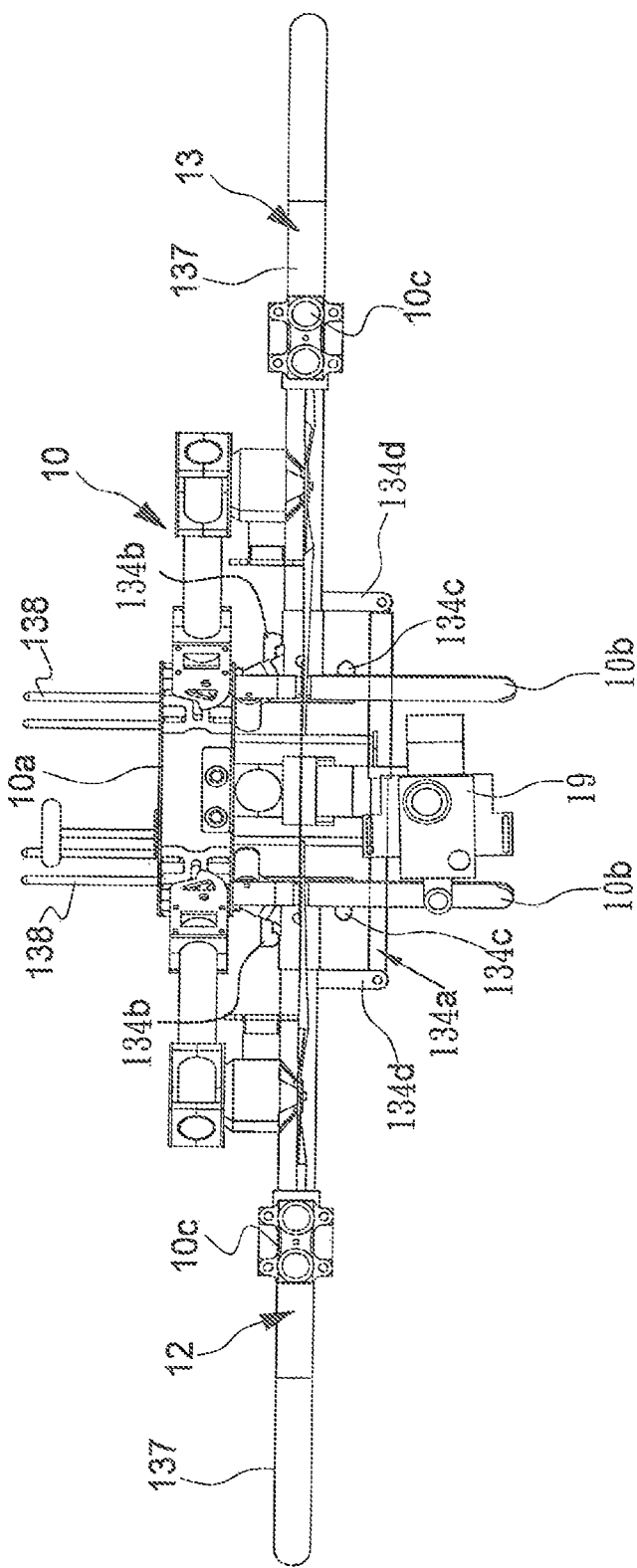
FIG. 7 is a schematic diagram of the electric driving mechanism performing extension action for the electric undercarriage forming an anti-collision frame according to the present invention.

Referring to FIGS. 6-7, the body 10a is extended downward with two straight rods 10b. The electric driving mechanism 134 includes a linear telescopic actuator 134a, two upper limiters 134b respectively disposed on the body 10a, two lower limiters 134c respectively disposed below the two straight rods 10b, and two bifurcated bars 134d extended from an upper section of the first bracket 120 and the second bracket 130 correspondingly, and distal ends of the two bifurcated bars 134d are pivotally connected to two ends of the linear telescopic actuator correspondingly. When the linear telescopic actuator 134a performs an extension action, the two bifurcated bar 134d are interacted to drive the first leg frame 12 and the second leg frame 13 to swing upward relative to the body 10a with the pivot points as turning points which are pivotal connecting points between the first leg frame 12, the second leg frame 13 and the body correspondingly. When the upper edges of the top ends of the first bracket 120 and the second bracket 130 are against the corresponding two upper limiters 134b, the linear telescopic actuator 134a stops the extension action, so that the first leg frame 12 and the second leg frame 13 can be used as the anti-collision frame for the UAV 10 shown as FIG. 7. Conversely, when the linear telescopic actuator 134a performs a contraction action, the two bifurcated bars 134d are interacted to drive the first leg frame 12 and the second leg frame 13 to swing downward relative to the body 10a. When the lower edges of the top ends of the first bracket 120 and the second bracket 130 are against the two lower limiters 134c respectively, the linear telescopic actuator 134a stops the contraction action, so that the first leg frame 12 and the second leg frame 13 can be used as a take-off and landing gear for the UAV 10 as shown in FIG. 6.

Referring to FIGS. 1 to 3 and FIG. 8, the UAV 10 of the present invention is applied for a bridge inspection system. The UAV 10 further includes a global positioning system module 16 configured for generating position signals of the UAV 10, a first wireless signal transmission module 19a (such as a short-range wireless Bluetooth communication module, or a ZigBee communication module, but not limited thereto) and a vibration sensing module 17a. The first signal processing module 14 has a built-in bridge inspection and flight parameters, and is configured to convert the position signals into position information, and converts the bridge inspection and flight parameters into corresponding inspection and flight commands. The first signal processing module 14 uses the position information, and the corresponding inspection and flight commands to produces flight control signals for the flight control module 18, so that the flight control module 18 according to the position information and the corresponding inspection and flight commands can drive the UAV 10 to perform the bridge inspection flights. When the UAV 10 lands at a vibration sensing position P4 of the bridge 1, the vibration sensing module 17a senses the vibration status of the bridge 1 the vibration sensing position P4 and generates corresponding vibration sensing signals, and then the first signal processing module 14 converts and processes the vibration sensing signals into corresponding bridge vibration values. The bridge inspection system further includes a monitoring unit 32, a warning module 35, and a wireless communication module 40 (such as a combination of a 4G or 5G mobile communication module and a 4G or 5G mobile communication network, but not limited thereto). The monitoring unit 32 is set on a ground control station for receiving and storing the bridge vibration values transmitted by the first signal processing module 14 through the wireless communication module 40. When the monitoring unit 32 calculates the vibration values being higher than a preset vibration threshold of the bridge 1, a warning signal representing overload is issued. The warning module 35 is configured to output the warning signal as overload warning information by voice, audio or display.

Referring to FIGS. 1-2 and FIGS. 4 and 9, the UAV 10 of the present invention is applied for a bridge inspection system. The UAV 10 further includes a global positioning system module 16 configured for generating position signals of the UAV 10, and a first wireless signal transmission module 19a. The first signal processing module 14 has built-in bridge inspection and flight parameters of the bridge inspection flights. The first signal processing module 14 converts the position signals into position information, and converts the bridge inspection and flight parameters into corresponding inspection and flight commands as flight control signals for the flight control module 18, so that the flight control module 18 according to the position information and the corresponding inspection and flight commands can drive the UAV 10 to perform the bridge inspection flights. The bridge inspection system further includes at least one bridge status sensing unit 50a, a second signal processing module 53, a wireless communication module 40 (such as a long-distance 4G, 5G mobile communication system), a monitoring unit 32 set on a ground control station and a warning module 35. The bridge status sensing unit 50a senses the use status of the bridge 1 and generates corresponding status sensing signals of the bridge 1. The second signal processing module 53 is located at a preset information transmission point P5 of the bridge 1, and convert and process the status sensing signals of the bridge 1 into corresponding bridge status data, and collect and record each bridge status data along a time axis in a memory module 53a. The second wireless signal transmission module 51 is controlled by the second signal processing module 53 to transmit out the bridge status data recorded in the memory module 53a. The monitoring unit 32 is located at the ground control station. When the UAV 10 arrives at a predict receiving position adjacent the information transmission point P5, the first signal processing module 14 on the UAV 10 receives the bridge status data through the communication between the first wireless signal transmission module 19a and the second wireless signal transmission module 51. When the UAV 10 flies back and arrives at a transmitting position adjacent the ground control station, the monitoring unit 32 communicates with the first signal processing module 14 by the wireless communication module 40 to receive the bridge status data transmitted out from the first signal processing module 14. The monitoring unit 32 calculates and analyzes the bridge status data of the bridge 1 along a time axis to produce corresponding bridge status values corresponding to bridge status estimation information. When the corresponding bridge status values are higher than corresponding preset bridge warning thresholds, then warning signals representing the corresponding critical statuses corresponding to bridge status estimation information of the bridge 1 are issued. The warning module 35 is configured to output the corresponding warning signals as critical warning information corresponding to the bridge status estimation information of the bridge statuses by voice, audio or display.

Specifically, the aforementioned bridge status estimation information can be bridge bearing load estimation information, bridge vibration estimation information, bridge girder reinforcement status estimation information, bridge supporting rubber status estimation information, bridge shock absorber status estimation information, vehicle type prediction information, bridge traffic flow estimation information, riverbed scour depth estimation information, and bridge structural soundness estimation information. Specifically, there is a plurality of bridge status sensing units 50a, and the plurality of bridge status sensing units 50a are arranged on several bridge decks of the bridge 1 respectively, and the plurality of bridge status sensing units 50a can be strain gauges, tri-axial accelerometers and thermometers.

More specifically, the monitoring unit of the present invention can use artificial intelligence technology to establish a bridge alert learning model that can perform calculations and analyzes on the bridge status data, and obtain preset bridge alert thresholds and bridge status estimation information with big data. Since the length of the bridge pier column has an obvious relationship with its vibration frequency, usually the shorter the pier column is, the higher the vibration frequency is, the present invention can use this relationship, i.e. use the change of the vibration frequency of the bridge pier column to estimate the degree of the scour depth, the soundness of the structure and foundation integrity relative to the vibration frequency of the bridge. As for the structural soundness analysis, the vibration sensing data can be used to evaluate the stiffness matrix of the current structure of the bridge. When the structural stiffness decreases, it means that the structural soundness is insufficient. This result can be used as a reference for subsequent bridge maintenance and reinforcement. If the bridge alert learning model training is completed, the bridge warning threshold can be further established. When the vibration frequency drops to the predict bridge warning threshold, it means that the stiffness of the bridge structure has decreased and the bridge structure has been damaged, and the caretaker can do emergency crisis management.

Referring to FIGS. 1 to 2 and FIGS. 5 and 9, the UAV 10 of the present invention is applied for a bridge inspection system. The UAV 10 further includes a first image capture device 19 which can capture bridge images along with the UAV 10 when flying along the bottom of the bridge 1 to obtain bridge images. The monitoring unit 32 communicates with the first signal processing module 14 by the wireless communication module 40 to receive the bridge images transmitted out from the first signal processing module 14. The monitoring unit 32 further includes a second image recognition module 33 and a bridge feature database 34 built with a plurality of bridge feature samples, and the plurality of bridge feature samples define a plurality of corresponding bridge status estimation information. The second image recognition module 33 is configured to extract the bridge feature for each bridge image, and perform a bridge status recognition step, so as to sequentially input the bridge feature into the bridge feature database 34 in order to predict the matching probability between the bridge feature and the bridge feature sample, when the matching probability is greater than a preset probability, then output the corresponding bridge status estimation information. Specifically, the aforementioned bridge status estimation information may be such information as the exposed status of girder reinforcement, the inclination of the bridge body, the exposed status of bridge piers, the status of supporting rubber, the status of shock absorbers, the status of scoured depth of the river bed or the status of structural soundness.

Figure 5:
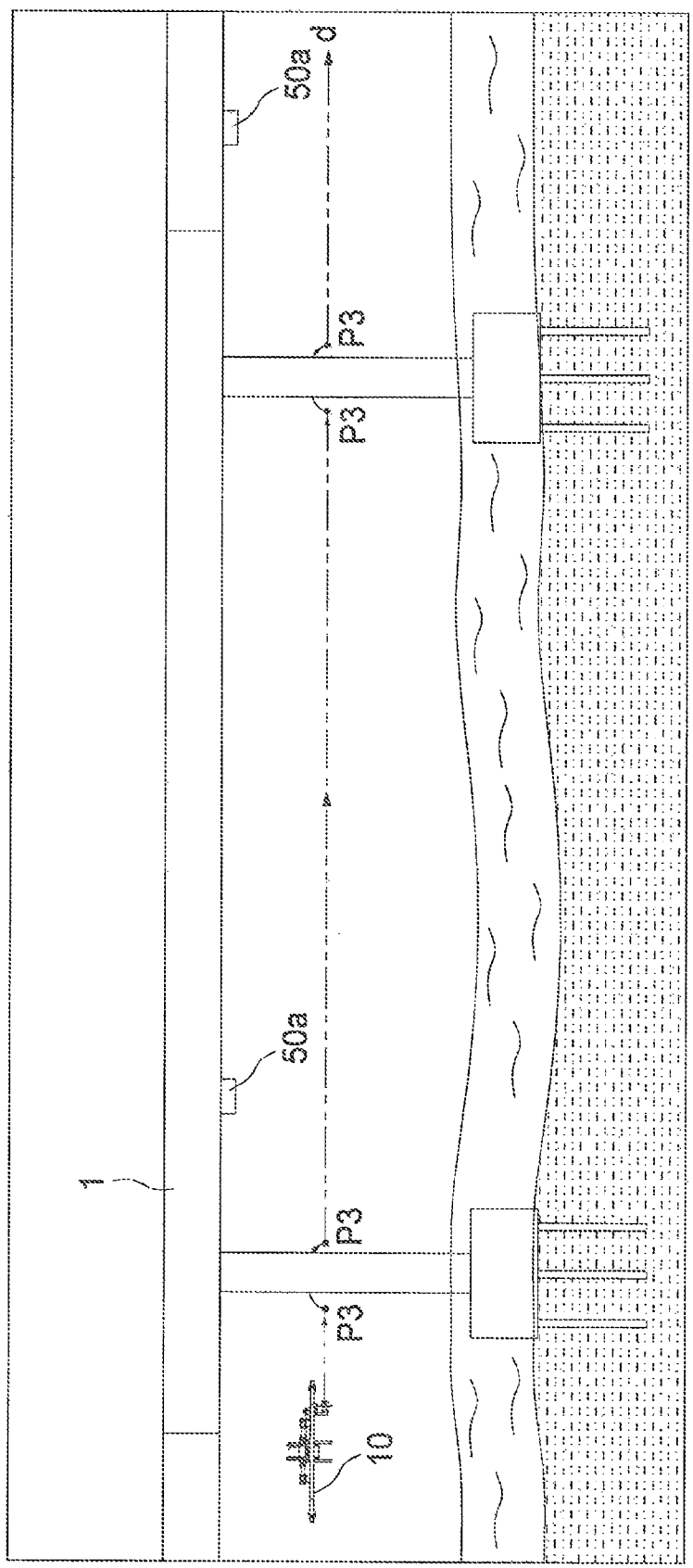
FIG. 5 is a schematic diagram of the third application implementation of the present invention.

Referring to FIGS. 1 to 2 and FIGS. 5 and 9, the bridge inspection and flight parameters are obtained by a preset flight schedule. The bridge inspection and flight parameters include flight path parameters and flight speed parameters along a predetermined flight path d, and the flight path parameters include coordinate parameters. When an inspection flight schedule is executed, the flight control module 18 is controlled by the first signal processing module according to the preset inspection and flight schedule to make the UAV 10 flying along the predetermined flight path d and sequentially arriving to multiple shooting positions P3 where multiple corresponding piers of the bridge 1 are located. The first signal processing module records each information transmission point P5 and navigation parameters such as serial number parameters, height parameters, coordinate parameters and arrival time parameters of each shooting position P3, and converts the navigation parameters to form corresponding bridge inspection and flight parameters. In addition, each bridge pier is provided with two shooting position points P3 at two opposite positions, as shown in FIG. 5.

Figure 9:
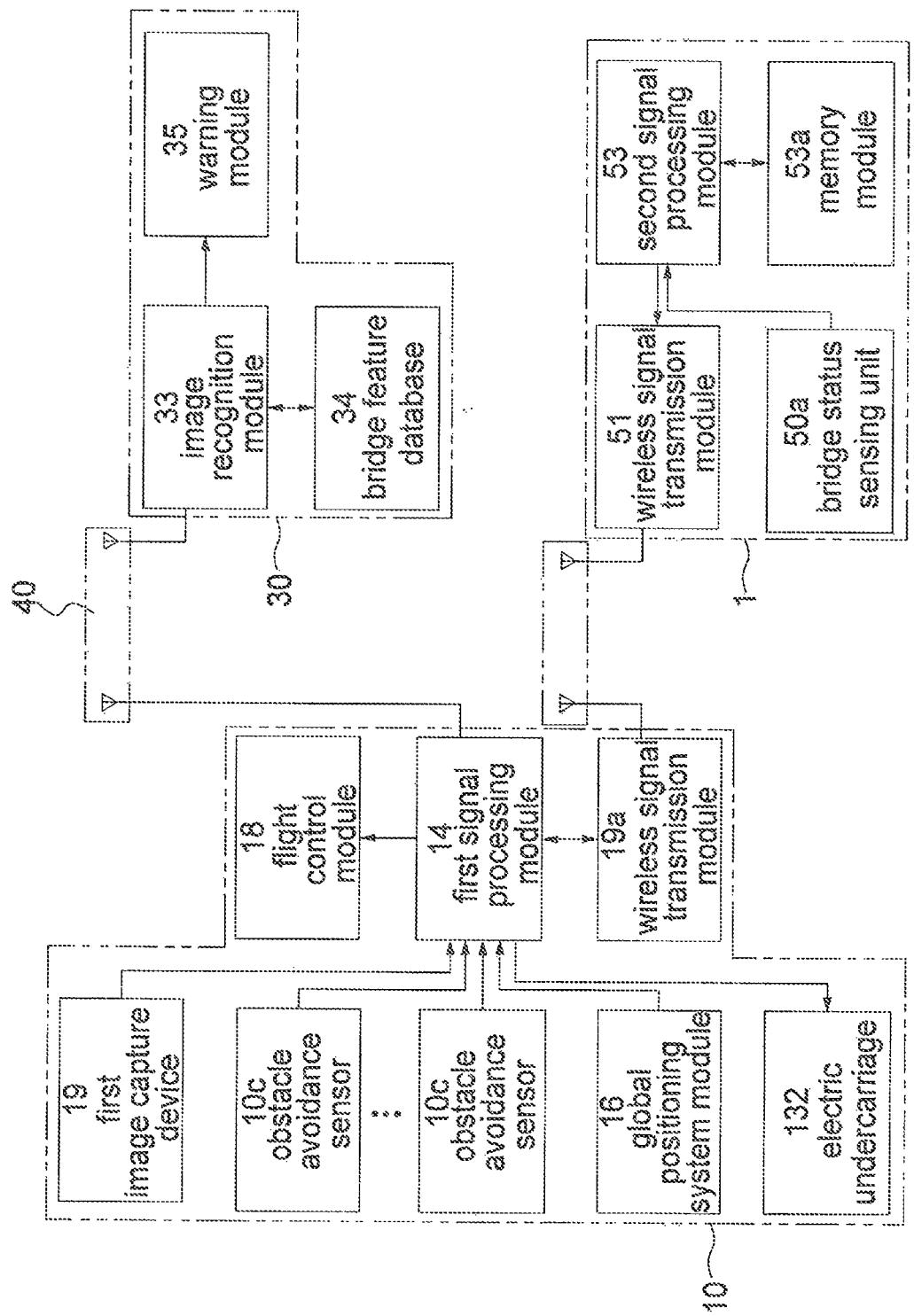
FIG. 9 is a schematic functional grid diagram of another specific implementation framework according to the present invention.

Specifically, referring to FIG. 9, the bridge inspection system of the present invention includes a wireless communication module 40 and an information display device 36 that is carried by the user and located at a position where the bridge 1 can be seen. The wireless communication module 40 is used to make the information display device and the UAV 10 perform wireless information or signals connection. When the UAV 10 performs the flight step of the preset inspection and flight schedule, the first image capture device 19 captures the bridge image and displays it on a touch interface of a display screen of the information display device, and the display screen displays the touch interface with the bridge images. The bridge images displayed on the touch interface is monitored on the display screen, and on the other hand, it is visually confirmed whether the UAV 10 flies to the vicinity of the shooting position P3. As shown in FIG. 5, when the user confirms that the UAV 10 has flown at the shooting position P3, he presses a touch interface to actuate the first signal processing module to proceed with a real-time shooting procedure to produce a stop control signal and a shoot control signal, so that the flight control module 18 controls the UAV 10 stop at the shooting position P3 and the first image capture device shoots the bridge image at the shooting position P3, and the monitoring unit receives and records the bridge image and coordination parameter of the shooting position P3. When the real-time shooting procedure is finished, the flight control module 18 controls the UAV keeping subsequent flight of the preset inspection and flight schedule.

In order to gain the method of the bridge inspection flight, a multi-rotor UAV 10 is used with a camera to inspect the bridge 1. The advantage of selecting the multi-rotor UAV 10 is that the UAV 10 can hover at a fixed point, the operation is simple, and it can fly automatically. Combining the above advantages, using the multi-rotor UAV as a tool for the bridge inspection flight can effectively improve efficiency, reduce costs, and ensure the safety of personnel during climbing inspections. From the system architecture diagram in FIG. 8, we know that the UAV 10 used for bridge inspections is equipped with various hardware, which is divided into three categories, flight control (including obstacle avoidance system), embedded system (i.e. the first signal processing module) and 5G module (that is, without wireless communication module). The ground terminal mainly uses the monitoring unit 32 as the ground control station. If there is any problem during the flight, the pilot will immediately take over the control through the remote control to ensure the safety of the UAV 10 and personnel.

The system of the present invention is set with an embedded system environment and required software installation, and installed software to the embedded system in conjunction with the UAV for the work of bridge inspection, such as image recognition, avoidance barriers, image transmission and communication, through the combination of these software and hardware, thereby an automatic flying bridge inspection UAV is then created.

The flight control module of the present invention adopts Pixhawk Orange Cube, which is responsible for the flight control and gimbal control of the UAV. The embedded system uses Nvidia Jetson Nano, which can be wrote programs to control the flight control module, read flight control information and input real-time images through CSI image input. Preferably, the present invention uses 5G communication module SIM8202G-M2 to allow the UAV to use 5G network communication for data transmission and image transmission. The database is set up by using the MySQL database to store the relevant information of the UAV and multiple sensors, so that the ground control station can capture the data and display it on the interface of the ground control station, so as to be convenient to view the flight information.

The design concept of ROS (Robot Operating System) is to improve the software reuse rate of robot research and development, so it is designed as a distributed architecture, so that each framework structure can be designed and compiled separately. ROS mainly provides functions such as hardware abstraction, underlying drivers, message delivery, program management, and application prototypes for robot development, and at the same time integrates many third-party tools and files to help users quickly write programs, build and integrate multiple machines. ROS is a framework suitable for robot programming. This framework couples the original loose components together and provides them with a communication framework. ROS builds a communication bridge between applications and runs in an environment on Linux. In this environment, the robot's perception, decision-making, and control algorithms can be better organized and run. The advantages and disadvantages of the ROS platform are sorted out in Table 1. According to the current requirement, it is necessary to add the architecture of the UAV 10 of the present invention. MAVROS acts as a communicating bridge between ROS and PX4. Among them, MAVROS has a ROS function package which is official supported under a protocol between ROS and MAVLink.

TABLE 1

| Advantage | Disadvantage |
| --- | --- |
| Provides framework, tools and functionality | Communication real-time performance is limited |
| Easy to transplant | The system stability does not meet the industrial level requirements |
| Huge user base | No security measures |
| Free open source | Only supports Linux |

Several kinds of obstacle avoidance sensors commonly used at present are infrared sensors, ZED binocular image capture device, optical radar (Lidar) or ultrasonic sensors and the like. The obstacle avoidance sensors used in the present invention are ZED binocular image capture device and optical radar (Lidar) sensors. Optical radar (Lidar) is a single-point or single-line ranging technology, which can be used to detect obstacles with a large area. Therefore, the front and rear of the UAV are respectively installed two Lidars thereon, and two Lidars are installed on the left and right sides respectively, so that obstacle avoidance can be achieved in four directions: front, rear, left, and right. The ZED binocular image capture device is installed in front of the UAV, which uses stereo vision to measure the distance of obstacles, and can provide more comprehensive obstacle avoidance sensing when the UAV is flying forward.

Referring to FIGS. 1 and 2, six LIDAR sensors are installed on the electric undercarriage 132 of the UAV 10 in according with the present invention. When the electric undercarriage 132 rises to become the anti-collision frame, it can provide obstacle avoidance in the four directions of front, rear, left and right. First, a self-propelled vehicle with four omni-directional wheels is used as a test, and ZED binocular image capture device and 6 Lidar sensors are installed to test the obstacle avoidance function. After the self-propelled vehicle test is completed, the software and hardware of the obstacle avoidance function will be transplanted to the UAV 10 of the present invention. After the test is successful, the system is transplanted to the UAV 10, and the first image capture device 19 (ZED binocular) and 6 Lidar sensors are used to send the data to the Jetson Nano. After the data is interpreted, it is sent to the Pixhawk for the action of avoidance. Use Yolo V4 (You only look once) in the Darknet environment to train the computer detection model to replace the traditional human inspection. After completing the training on the computer, the present invention installs the embedded system (Jetson Nano) on the UAV 10, and imports the trained data, so as to fully integrate the Yolo recognition system with the UAV 10, so as to realize the practical application of the UAV 10 to carry out the bridge inspection work. In addition, the present invention also applies open CV in nano to do the image processing that the UAV 10 sends back to the system for identification at the moment of shooting, so that the inspectors in the operation inspection can obtain the analyzed image in real time to achieve inspection effect. Therefore, enough databases can be used to train the model, and the defects of bridge piers, girders, and surrounding supports can be detected.

Furthermore, in the case of insufficient light under the bridge, there will be a problem of poor photo image quality. The solution is to install high-brightness LEDs on the three-axis gimbal on the UAV 10, and when the first image capture device 19 shoots, high-brightness LEDs can fill in light on the shooting target, so that clear photos can be taken. Thus, the anti-collision frame has the functions of protecting the propeller and acting as an undercarriage at the same time. It can reduce the take-off weight, increase the endurance time, and use the saved weight to add other detection equipment. The electric undercarriage 132 of electric lifting mainly utilizes spring to cooperate with servomotor to cooperate gear set to control the retractable action of first leg frame 12 and second leg frame 13. A linear telescopic actuator 134*a* is arranged between them to realize the purpose of retracting for the first leg frame 12 and the second leg frame 13, shown as in FIGS. 6 and 7.

In addition, the present invention can also utilize Yolo V4 to carry out image recognition, classify and identify the bridge status estimation information, and then display it on the ground control station with real-time images. The way to find the object is to use the confidence level of all the rectangular squares to delete the rectangular squares that are determined not to contain any objects. If all the rectangular squares in the grid do not contain objects, delete the square. Since the object may span multiple rectangular grids at the same time, some overlapping rectangular grids can be eliminated by using the NMS algorithm Each grid only detects a single object. If there are multiple objects in the grid, the one with the highest confidence level is taken as the object in the grid. After repeated execution in this way, the remaining squares are the selected objects. Finally, the category of the object can be determined by combining the selected object and the category of the corresponding grid.

Figure 15:
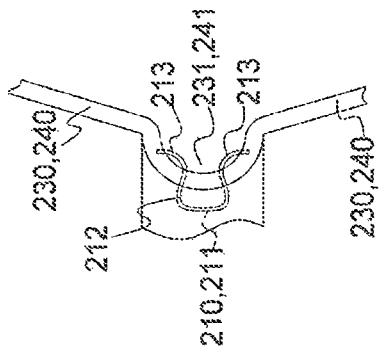
FIG. 15 is a schematic diagram of the structure of the second positive electrode and the second negative electrode of the present invention.
Figure 16:
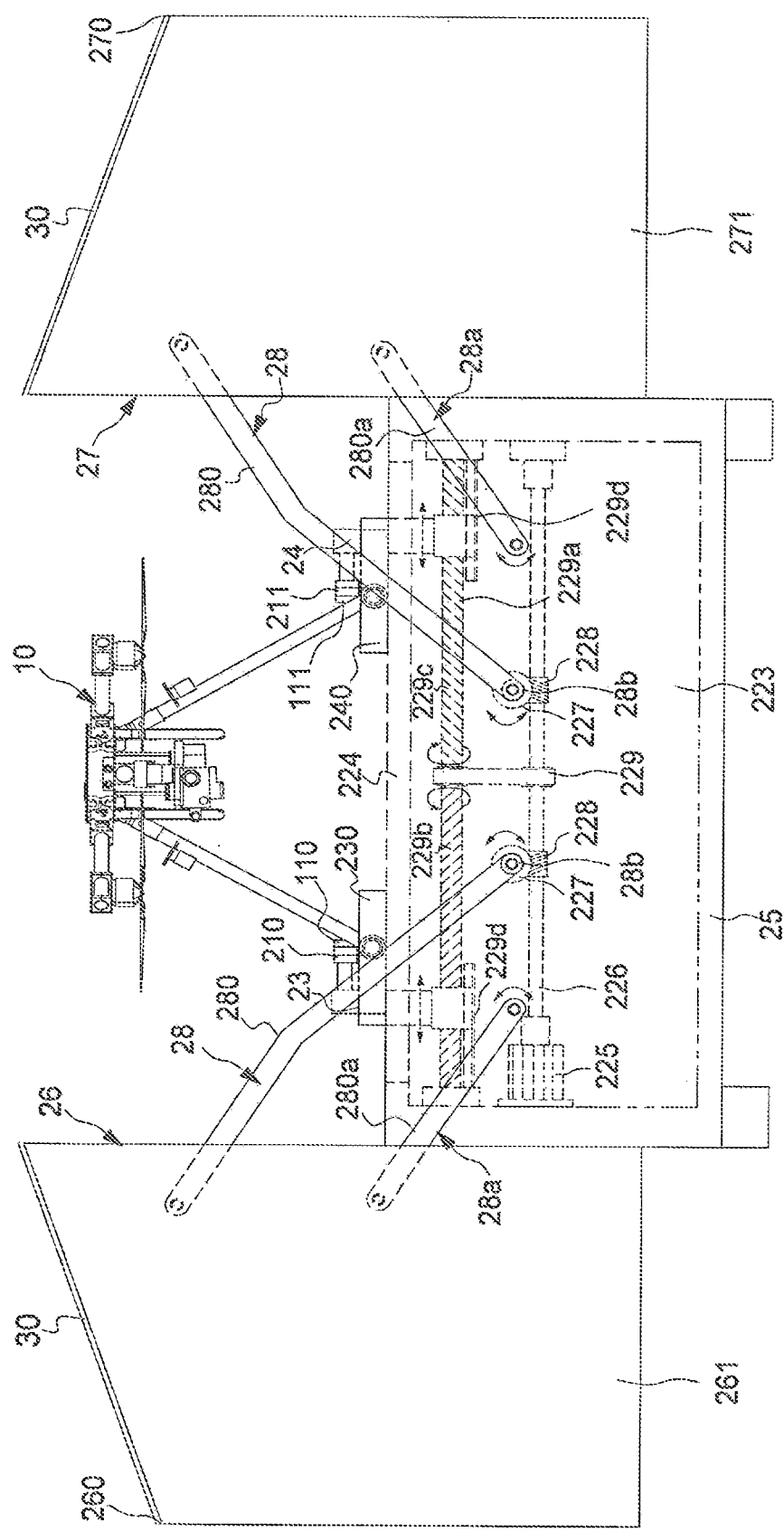
FIG. 16 is a schematic diagram of the platform with the first sliding door and the second sliding door attached and in an open status according to the present invention.

As shown in FIGS. 10-19, the present invention includes a UAV 10 and a charging station 20. The UAV 10 includes a power charge/storage module 11. The power charge/storage module 11 includes a first positive electrode 110 and a first negative electrode 111. The charging station 20 includes a power charge/supply module 21. The power charge/supply module 21 includes a second positive electrode 210 and a second negative electrode 211. When the UAV 10 flies to the platform 20*a* of the charging station the first positive electrode 110 and the first negative electrode 111 are in corresponding contact with the second positive electrode 210 and the second negative electrode 211 respectively. The power charge/supply module 21 charges the power charge/storage module 11 through the first positive electrode 110, the first negative electrode 111, the second positive electrode 210 and the second negative electrode 211. The first positive electrode 110 and the first negative electrode 111 are respectively disposed on a first leg frame 12 and a second leg frame 13 on two sides of the UAV 10 symmetrical to a first vertical plane P1. The power charge/supply module 21 includes a sliding drive assembly 22, a first movable seat 23 and a second movable seat 24. The first movable seat 23 and the second movable seat 24 are respectively provided with a first V-shaped guide plate 230 and a second V-shaped guide plate 240. The first V-shaped guide plate 230 and the second V-shaped guide plate 240 are symmetrical to a second vertical plane P2 and respectively located above the platform 20a. The second positive electrode 210 and the second negative electrode 211 are symmetrically arranged on the first V-shaped guide plate 230 and the second V-shaped guide plate 240 correspondingly, and are located on angle bisectors of the first V-shaped guide plate 230 and the second V-shaped guide plate 240. The sliding drive assembly 22 is used to drive the first movable seat 23 and the second movable seat 24 to move relatively between a first position and a second position. When the UAV 10 is parked on the platform 20a, and the first movable seat 23 and the second movable seat 24 are relatively positioned in the first position, the first positive electrode 110 and the first negative electrode 111 are separated and without contact from the second positive electrode 210 and the second negative electrode 211. When the first movable seat 23 and the second movable seat 24 move relatively from the first position to the second position, the first V-shaped guide plate 230 and the second V-shaped guide plate 240 push the first leg frame 12 and the second leg frame 13 respectively. When the second leg frame 13 reaches the coincidence of the first vertical plane P1 and the second vertical plane P2, the first positive electrode 110 and the first negative electrode 111 are in correspondingly contact with the second positive electrode 210 and the second negative electrode 211 respectively, so that the power charge/storage module 11 can be charged by the power charge/supply module 21 through the first positive electrode 110, the first negative electrode 111, the second positive electrode 210 and the second negative electrode 211. An accommodating space 223 is provided inside the platform 20a for accommodating the sliding drive assembly 22. A slide rail 222 is disposed in the accommodation space 223. A groove 224 communicating with the accommodating space 223 extends across the top surface of the platform 20a. Referring to FIG. 16, the sliding drive assembly 22 includes a motor 220, a screw rod 229a driven by the motor 220, and two nuts 221 screwed on the screw rod 229a to move in reverse on the slide rail 222. The two nuts 221 are respectively connected to the corresponding first movable seat 23 and the second movable seat 24, and the motor 220 drives the screw rod 229a to respectively drive the two nuts 221 to reversely move between the first position and the second position.

In the UAV 10 used in the present invention, the first leg frame 12 includes a first bracket 120 and a first bottom bar 121, and the second leg frame 13 includes a second bracket 130 and a second bottom bar 131. The top ends of the first bracket 120 and the second bracket 130 are respectively connected to the body 10a of the UAV 10, and the bottom ends are respectively connected to the first bottom bar 121 and the second bottom bar 131 which are for the UAV 10 stably standing on the platform 10a. The first bracket 120 and the second bracket 130 are symmetrical to the first vertical plane P1. The first positive electrode 110 and the first negative electrode 111 are respectively disposed on the first bracket 120 and the second bracket 130. As shown in FIGS. 10-19, the first V-shaped guide plate 230 and the second V-shaped guide plate 240 respectively push the first bracket 120 and the second bracket 130, the second positive electrode 210 and the second negative electrode 211 in addition to being respectively located on the bisectors of the angles of the first V-shaped guide plate 230 and the second V-shaped guide plate 240, is also respectively located on corners 231/241 of the first V-shaped guide plate 230 and the second V-shaped guide plate 240. When the first movable seat 23 and the second movable seat 24 move from the first position to the second position, the first V-shaped guide plate 230 and the second V-shaped guide plate 240 push the first bracket 120 and the second bracket 130 respectively. When the first movable seat 23 and the second movable seat 24 moved to the second position, the second positive electrode 210 and the second negative electrode 211 on the corners 231/241 of the first V-shaped guide plate 230 and the second V-shaped guide plate 240 moved to the second position, the first positive electrode 110 and the first negative electrode 111 disposed on the first bracket 120 and the second bracket 130 respectively are in contact with the second positive electrode 210 and the second negative electrode 211. Preferably, the first positive electrode 110 and the first negative electrode 111 are in arc-shaped respectively. Referring to FIG. 15, the second positive electrode 210 and the second negative electrode 211 are respectively in the shape of a C-ring piece 212 and two anti-C ring pieces 213 respectively bent outward from two ends of the C-ring piece 212. When the two anti-C ring pieces 213 were expanded outwards relative to a central point of the positive C-ring piece 212 by an external force, the positive C-ring piece 212 had a return elastic force. When the first movable seat 23 and the second movable seat 24 moves to the second position by the external force, the two anti-C ring pieces 213 of the second positive electrode 210 and the second negative electrode 211 are correspondingly in contact with the arc-shaped first positive electrode 110 and first negative electrode 111 by the external force.

As shown in FIGS. 10 to 19, the charging station 20 includes a base 25 for an embodiment of the present invention with a sliding door attached. The platform 20a is disposed on the top of the base 25. The charging station 20 is provided with a first sliding door 26 and a second sliding door 27. The first sliding door 26 and the second sliding door 27 are pivotally disposed on the base 25 corresponding to the platform 20a. The sliding drive assembly 22 drives the first movable seat 23 and the second movable seat 24 to move relatively between the first position and the second position, and synchronously drives the first sliding door 26 and the second sliding door 27 to move relatively to the third position and the fourth position. When the first movable seat 23 and the second movable seat 24 relatively moved to the first position, the first sliding door 26 and the second sliding door 27 moved relatively to the third position and moved away from each other, the upper space of the platform 20a is in an open status, and the UAV 10 can take off or land on the platform 20a. When the first movable seat 23 and the second movable seat 24 are relatively moved to the second position, the first sliding door 26 and the second sliding door 27 are relatively moved to the fourth position and close to each other, so that the upper space of the platform 20a is in a closed status to protect the UAV 10 parked on the platform 20a. The first sliding door 26 and the base 25 are connected by a main linkage set 28 and a secondary linkage set 28a to form a first four-bar linkage mechanism. The second sliding door 27 and the base 25 are connected by a main linkage set 28 and a secondary linkage set 28a to form a second four-bar linkage mechanism. The first sliding door 26 includes a quadrangular first top door 260 and three first side doors 261 surrounding three sides of the first top door 260. The second sliding door 27 is provided with a quadrangular second top door 270 and three second side doors 271 surrounding three sides of the second top door 270. When the first sliding door 26 and the second sliding door 27 are relatively moved to the fourth position and relatively close together, the first top door 260 and the second top door 270 are connected and respectively covered the upper space above the platform 20a, and the three first side doors 261 and the three second side doors 271 corresponds to the surrounding space of the platform 20a, so that the platform 20a is in a closed status of up and down and around and the UAV 10 is shielded and protected by the first sliding door 26, the second sliding door 27 and the platform 20a. Each main linkage set 28 includes two main connecting rods 280 positioned at two opposite sides of the first sliding door 26, the second sliding door 27 and the base 25 correspondingly. Each secondary linkage set 28a includes two secondary connecting rods 280a positioned at two opposite sides of the first sliding door 26, the second sliding door 27 and the base 25 correspondingly. Top ends of the main connecting rods 280 are pivotally connected to the first sliding door 26 and the second sliding door 27 correspondingly. Bottom ends of the main connecting rods 280 are pivotally connected to the base 25 correspondingly. Top ends of the secondary connecting rods 280a are pivotally connected to the first sliding door 26 and the second sliding door 27 correspondingly. Bottom ends of the secondary connecting rods 280a are pivotally connected to the base 25 correspondingly. The bottom ends of the two main connecting rods 280 positioned at two opposite sides of the base 25 are coaxially connected to a linkage bar 28b. Also, the bottom ends of the two secondary connecting rods 280a positioned at two opposite sides of the base 25 are coaxially connected to a linkage bar 28b. An accommodating space 223 for accommodating the sliding drive assembly 22 is disposed inside the base 25 and under the platform 20a. A groove 224 communicating with the accommodating space 223 extends laterally from the top surface of the platform 20a. The sliding drive assembly 22 includes a motor 225, a rotating shaft 226, a screw rod 229a pivotally arranged on the two relative walls of the accommodating space 223 and positioned above the rotating shaft 226, and a linkage assembly 229 (which may be gears are respectively arranged on the rotating shaft 226 and the screw rod 229a to mesh with each other to form interlocking motion, or sprockets can be respectively arranged on the rotating shaft 226 and the screw rod 229a to fit the chain to form interlocking motion), two nuts 229d respectively and movably screwed on the screw rod 229a, two worms 228 respectively arranged on the rotating shaft 226 in synchronous rotation status, and two worm gears 227 respectively fixed on the two linkage bars 28b and engaged with the two worms 228 oppositely. The first movable seat 23 and the second movable seat 24 are connected to the two nuts 229d correspondingly. One end of the rotating shaft 226 is connected with the output shaft of the motor 225, and the other end is pivotally connected with the wall of the accommodating space 223. The screw rod 229a has two thread segments 229b/229c that are opposite to each other for the two nuts 229d to be screwed together and move in reverse. When the motor 225 actuates the rotating shaft 226 together with the two worms 228 to rotate in clockwise direction, the two worms 228 drives the two worm gears 227 and the linkage bars 28b to rotate forward, and the linkage bars 28b drives the main connecting rods 280 of the main linkage sets 28 correspondingly. The main connecting rods 280 respectively rotate in a first direction and a second direction with respect to the linkage bars 28b as turning axes correspondingly, then to drive the first sliding door 26 and the second sliding door 27 to swing to a third position, and then to interact the secondary connecting rods 280a to auxiliary support the swings of the first sliding door 26 and the second sliding door 27 to the third position respectively. Simultaneously, the linkage assembly 229 is driven by the rotating shaft 226 to interact the screw rod 229a to rotate in the forward direction, so that the screw rod 229a actuates the two nuts 229d to move in opposite directions to interact the first movable seat 23 and the second movable seat 24 to move oppositely to each other to the first position. When the motor 225 actuates the rotating shaft 226 together with the two worm 228 to rotate in counterclockwise direction, the two worm 228 drives the two worm gear 227 and the two linkage bars 28b to rotate in reverse, and the linkage bars 28b drives the two main connecting rods 280 of the two main linkage sets 28 correspondingly. The main connecting rod 280 respectively rotate in a third direction and a fourth direction with respect to the linkage bars 28b as turning axes correspondingly, then to drive the first sliding door 26 and the second sliding door 27 to swing to a fourth position, and then to interact the secondary connecting rods 280a to auxiliary support the swings of the first sliding door 26 and the second sliding door 27 to the fourth position respectively. Simultaneously, the linkage assembly 229 is driven by the rotating shaft 226 to interact the screw rod 229a to rotate in the opposite direction, so that the screw rod 229a actuates the two nuts 229d to move closely to each other to drive the first movable seat 23 and the second movable seat 24 to move closely to each other to the second position.

Figure 17:
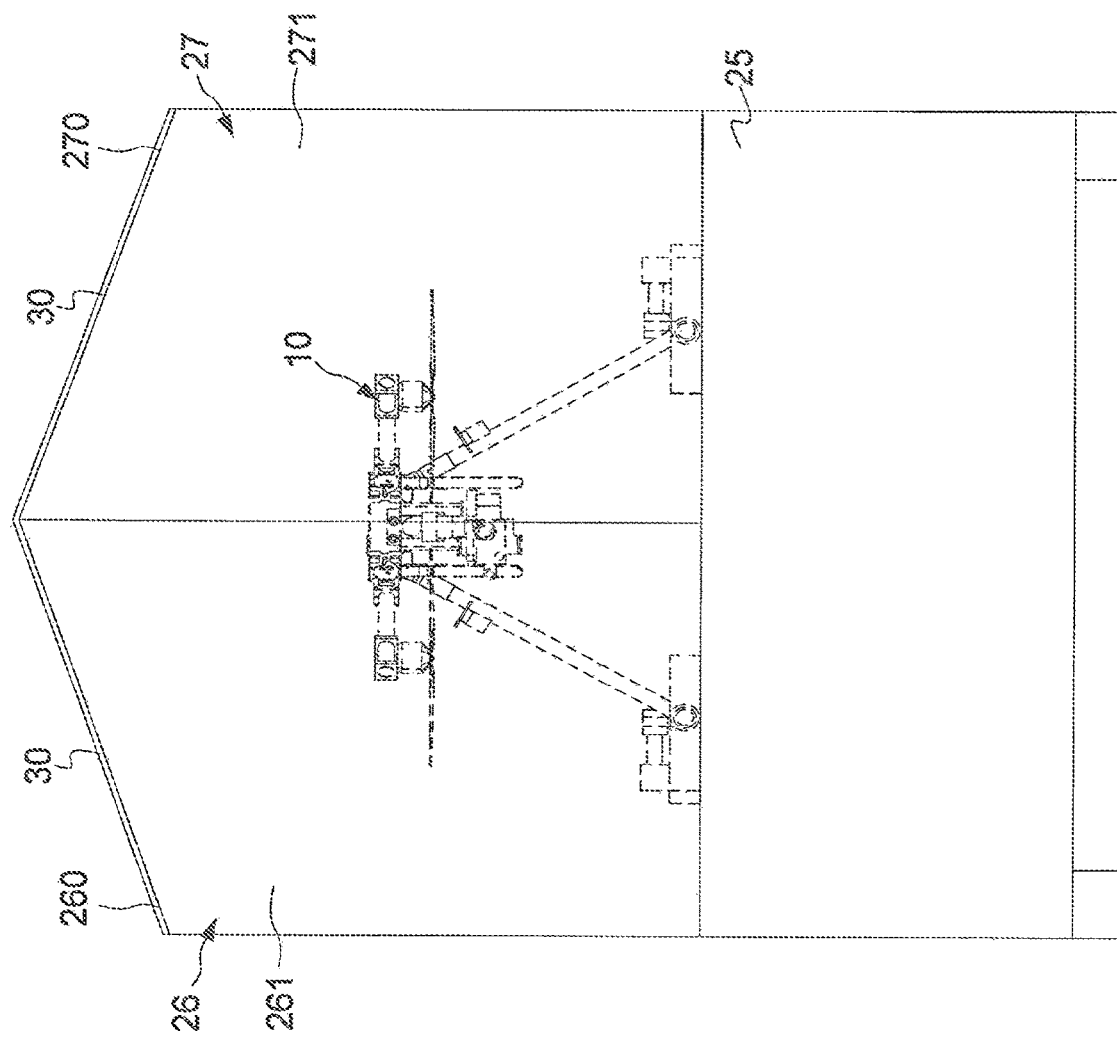
FIG. 17 is a schematic diagram of the platform with the first sliding door and the second sliding door attached and in a closed status according to the present invention.
Figure 18:
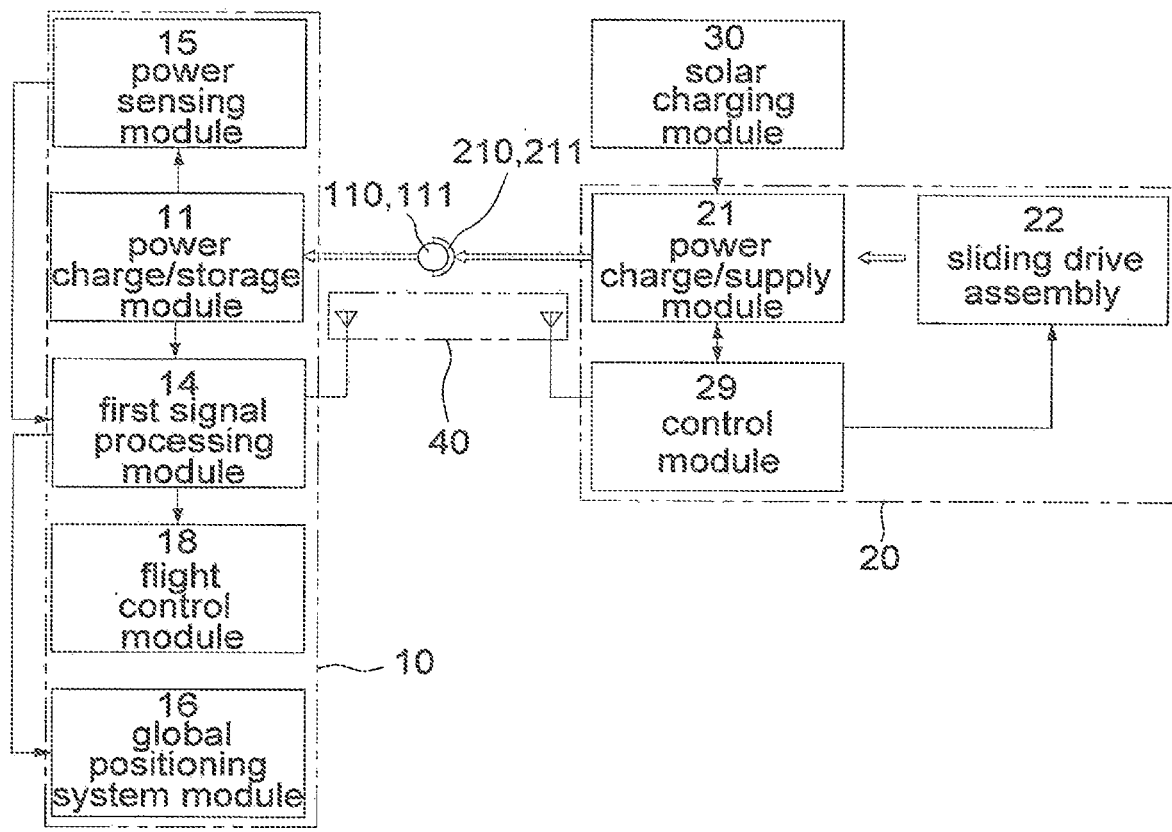
FIG. 18 is a schematic diagram of the functional grid implementation of the specific architecture according to the present invention.

As shown in FIGS. 16 to 18, the charging station 20 is provided with a solar charging module 30, and the solar charging module 30 includes a plurality of solar panels 31. The plurality of solar panels 31 are respectively disposed on the first sliding door 26 and the second sliding door 27 for receiving sunlight and convert the sunlight into electricity and saving the electricity in the power charge/supply module 21 of charging station 20.

As shown in FIG. 18, the UAV 10 further includes first signal processing module 14, and power sensing module 15 in order to have functions such as power sensing, continuous monitoring, and automatic disconnection to stop charging during charging. The charging station 20 is provided with a power control module 29. The first signal processing module 14 is connected with the power control module 29 via a wireless communication module 40 (such as a short-distance Bluetooth communication system; but not limited thereto). The first signal processing module 14 utilizes the power sensing signal provided by the power sensing module 15 to continuously monitor the charging status of the power charge/storage module 11, and when the charging status of the power charge/storage module 11 is in fully charge, then the first signal processing module 14 through the wireless communication module 40 transmits a control command representing charging completion to the power control module 29 of the charging station so that the power control module 29 controls the power charge/supply module 21 to stop charging the power charge/storage module 11.

Figure 10:
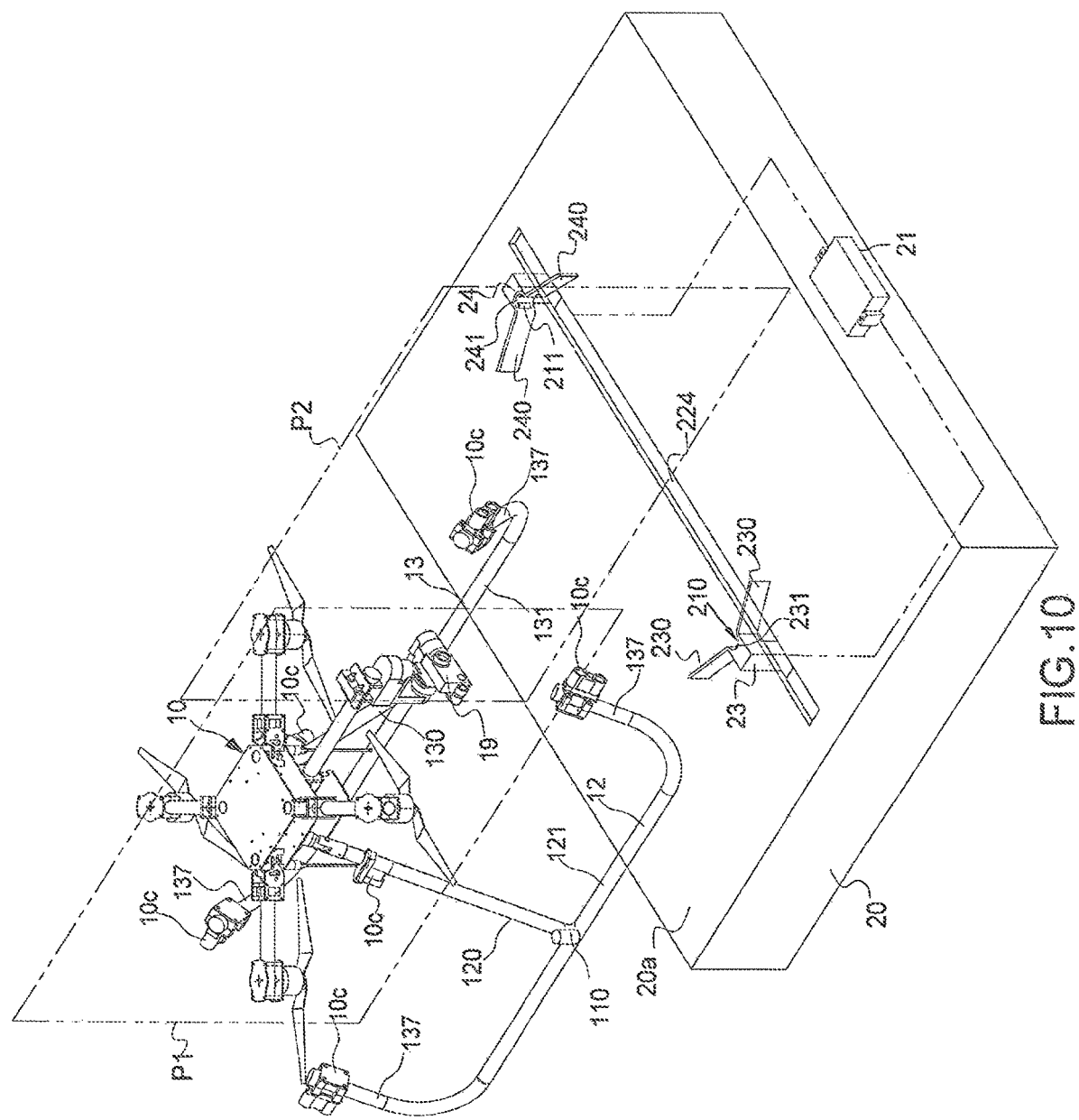
FIG. 10 is a schematic diagram of one embodiment of the present invention and the implementation of the UAV preparing to land.
Figure 11:
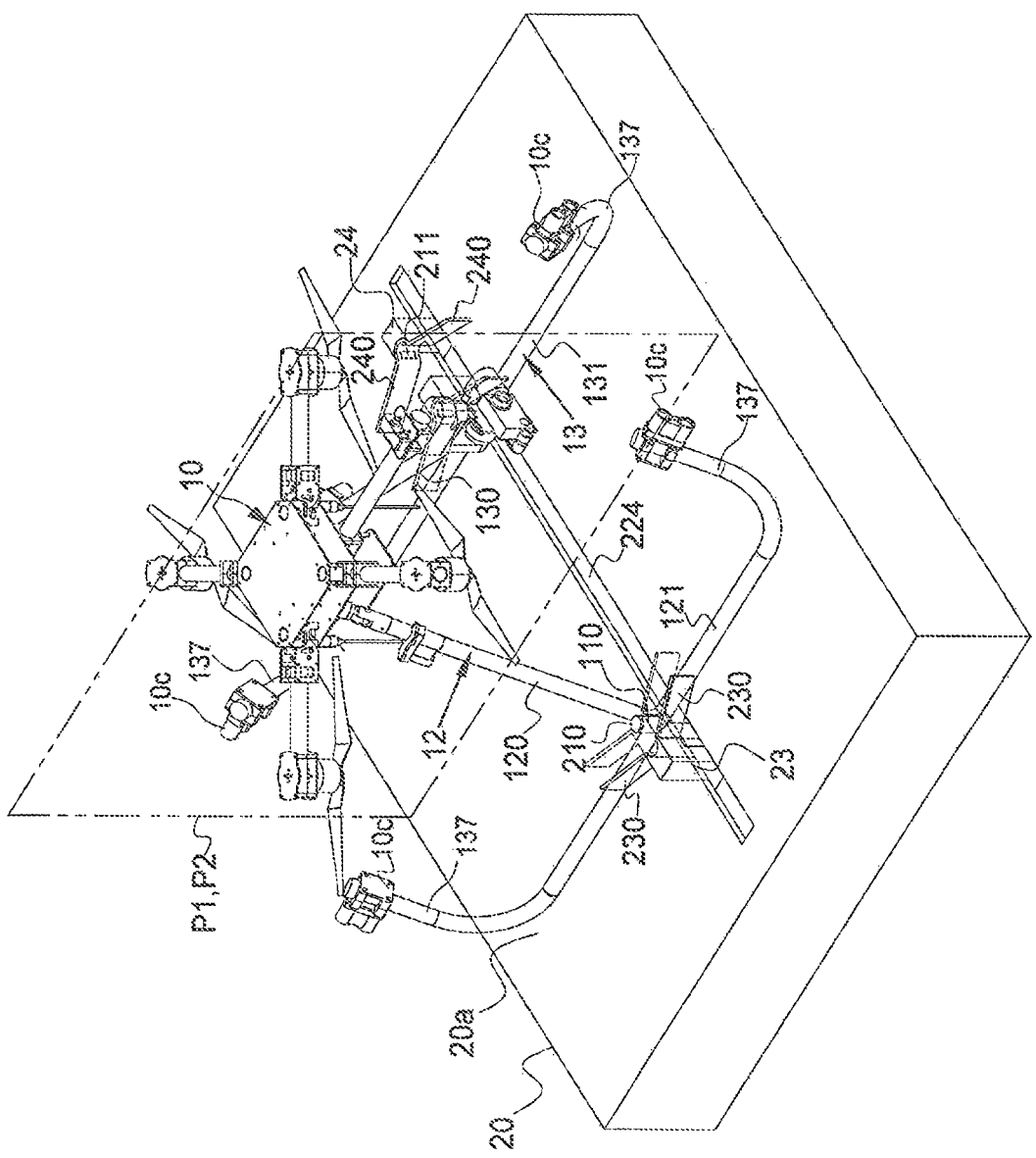
FIG. 11 is the schematic diagram showing the UAV positioned on the platform and ready to charge according to the present invention.
Figure 12:
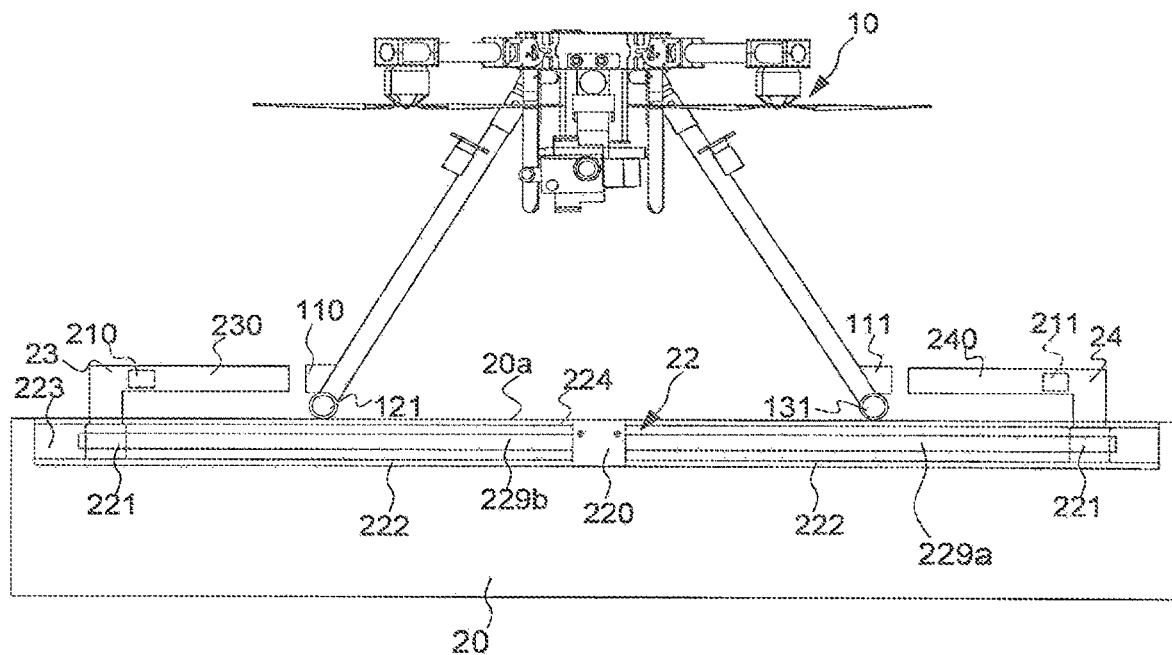
FIG. 12 is a partial cross-sectional schematic diagram showing the UAV on the platform but not in charge status according to the present invention.
Figure 13:
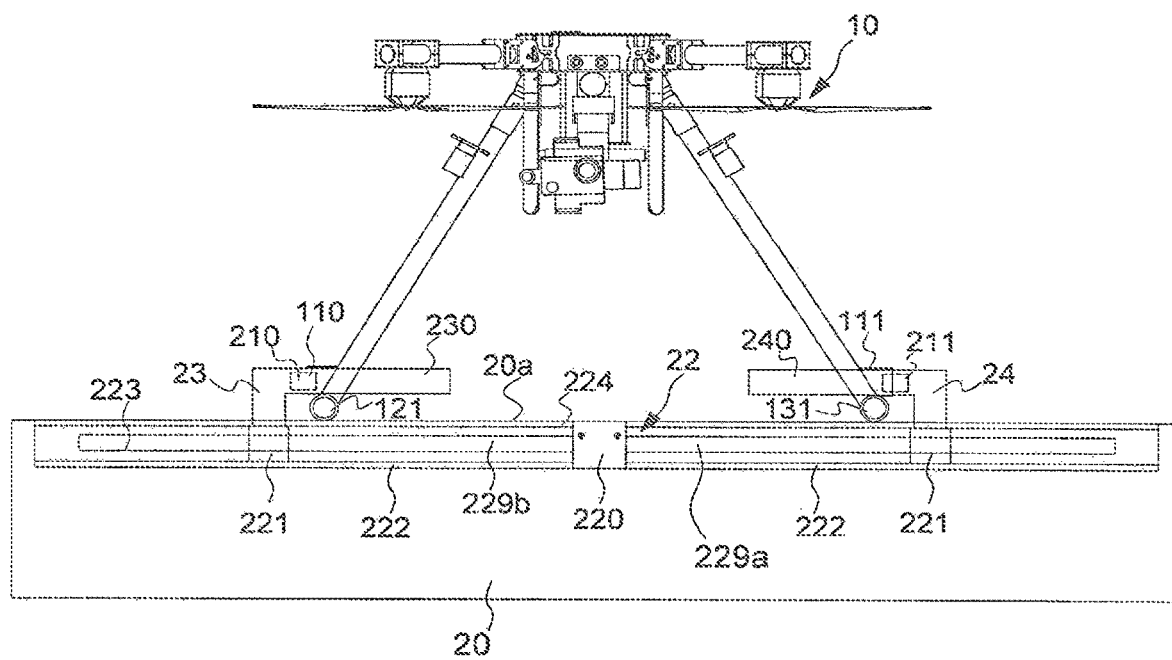
FIG. 13 is a partial cross-sectional schematic diagram showing the UAV on the platform and in charge status according to the present invention.
Figure 14:
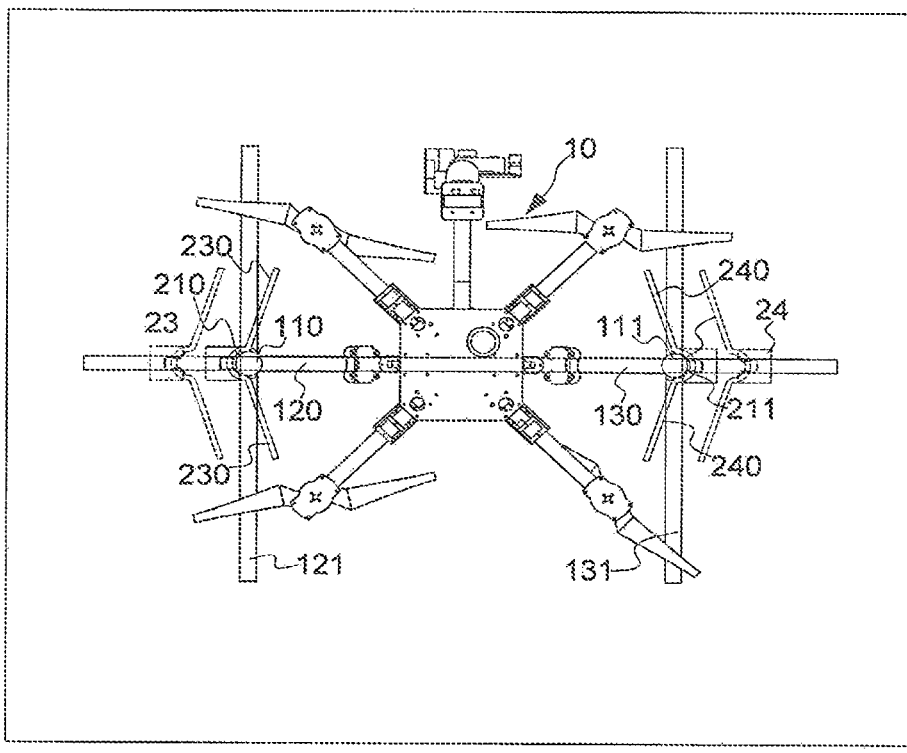
FIG. 14 is a schematic top view showing the UAV located on the platform, and the first movable seat and the second movable seat are far away from the UAV according to the present invention.
Figure 19:
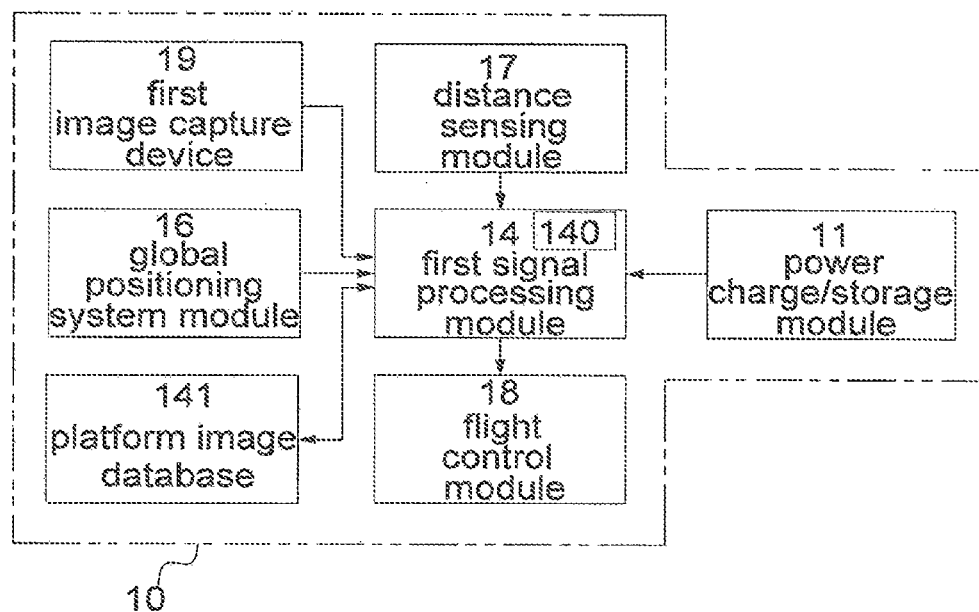
FIG. 19 is a schematic functional grid diagram of the specific architecture of the UAV according to the present invention.

As shown in FIGS. 10, 11 and 19, the UAV 10 further includes global positioning system module 16 for providing position signals, first signal processing module 14 with a built-in first image recognition module 140, distance sensing module 17, flight control module 18 configured to control the UAV 10 and first image capturing device 19. The first signal processing module 14 generates a flight control command according to a preset flight path and position signals, so that the flight control module 18 controls the UAV 10 to fly to the charging station 20 according to the flight control command. When the UAV 10 arrives above the charging station 20, the first signal processing module 14 is configured to perform a parking/charging flight to activate the first image capture device 19 to continuously capture images of the platform to obtain platform images, and to activate the distance sensing module 17 to continuously sense distances between the UAV 10 and the platform 20*a* so as to produce corresponding distance sensing signal. The first image recognition module 140 is configured to establish a platform image database 141, the platform image database 141 is preset predict platform images, each predict platform image is divided into nine square grids, the nine square grids are arranged in a square array, a center of each grid is set with a gravity coordinate parameter, and one central grid of the nine grids is set as a target grid for the UAV 10 arriving to land on the platform 20*a*; the first image recognition module 140 is configured to extract the features of the platform images, to remove backgrounds of the platform images to obtain foregrounds of the platform images, to substitute the foregrounds of the platform images into the platform image database 141 to compare with the nine square grids of corresponding predict platform images, to calculate coordinates of gravity centers of the foregrounds of the platform images according to the corresponding gravity coordinate parameters of the nine square grids so as to obtain corresponding real-time coordinate information, and to proceed with a first judgment to judge whether one of the real-time coordinate information coincides with the corresponding coordinate parameter of the target grid or not; wherein, when the first judgment result is yes, the first image recognition module 140 is configured to start the distance sensing module 17 to produce real-time distance sensing signals so as to obtain real-time distance values, to proceed with a second judgment to judge whether one of the real-time distance values is 0 or close to 0 or not; wherein, when the second judgment result is not 0 or not close to 0, a corresponding correction parking/charging flight instruction is generated for the flight control module 18 to make the UAV 10 correcting the parking/charging flight control commands until the first and second judgments are both yes.

Through the description of the above specific embodiments, the present invention does have the following characteristics. First, the present invention can indeed be set by functions such as obstacle avoidance and take-off and landing anti-collision, except that it can effectively avoid obstacles during bridge inspections in addition, it can be used as an anti-collision frame when it is lifted into the air, and if it has a buffer and anti-collision protection function when it hits a bridge or a bridge pier, it can be used as a take-off and landing tripod when it lands. Second, the function of measuring the vibration status of the bridge is mainly to let the UAV fly to the fixed point of the bridge to sense the vibration status of the bridge, so as to monitor and warn the load caused by the peak value of the traffic vibration of the bridge; the UAV can fly to the fixed point of the bridge to sense the vibration status of the bridge to monitor and warn the load caused by the peak vibration of the traffic flow of the bridge. Third, the present invention does have the function of capturing and utilizing fixed-point sensing data of the bridge, mainly to allow UAVs to fly to the bridge for capturing bridge inspection data at fixed points to monitor and warn traffic flow, vehicle types, loads, bridge status and pier status. Fourth, the present invention does have the functions of image recognition of bridge status and warning. Fifth, the function of automatic guided contact charging is set to realize the function of automatic guided UAV quick contact charging, so it has no need to use manpower to replace the battery and effectively save labor costs. Sixth, the present invention does have the ability to provide sunshade and rain protection for the charging station, the protection function can indeed provide sunshade and rain protection for the charging station through the function setting of automatic guided contact charging and sliding door opening and closing, thereby preventing the components of the charging station from being easily damaged by factors such as sunlight and moisture Damage occurs. Seventh, the present invention is indeed a charging system for unmanned aerial vehicles with solar energy independent power generation function. Eighth, the present invention does have the function of automatic guidance for short-field landing, so as to improve the success rate of unmanned aerial vehicles landing at charging stations. Ninth, the present invention is indeed a smart guided charging management system that can be applied to the UAV charging system, and can indeed improve the management efficiency of UAV swarm landing charging by means of image recognition technology.

While we have shown and described the embodiment in accordance with the present invention, it should be clear to those skilled in the art that further embodiments may be made without departing from the scope of the present invention.

What is claimed is:
1. An unmanned aerial vehicle system with a multifunctional leg assembly and a charging system, which comprises a UAV and a charging station;
 wherein, the UAV comprising:
  a plurality of obstacle avoidance sensors configured to sense obstacles near the UAV to generate obstacle sensing signals;
  a flight control module and a first signal processing module; the first signal processing module configured to produce flight control signals for the flight control module; the flight control module configured to drive the UAV to perform bridge inspection flights according to the flight control signals; the first signal processing module interprets and processes the obstacle sensing signals to judge whether there is an obstacle near the UAV; wherein, when the judgment result is that there is an obstacle, the first signal processing module generates an avoidance command and transmits the avoidance command to the flight control module, and according to the avoidance command the flight control module drives the UAV to perform an avoidance flight to avoid the obstacle near the UAV;
  an electric undercarriage comprising an electric driving mechanism, and a first leg frame and a second leg frame being rotatably pivoted on two corresponding sides of a body of the UAV; the electric driving mechanism configured to be controlled by the first signal processing module to drive the first leg frame and the second leg frame to perform relative folding and unfolding actions alternatively; wherein, when the UAV is to land, the electric driving mechanism drives the first leg frame and the second leg frame to perform the folding action to serve as a landing gear for the UAV; wherein, when the UAV is lifted into the air, the electric driving mechanism drives the first leg frame and the second leg frame to perform the unfolding action to serve as an anti-collision frame for the UAV; and a power charge/storage module, the power charge/storage module comprising a first positive electrode and a first negative electrode; wherein, the first positive electrode and the first negative electrode being disposed on the first leg frame and the second leg frame on the two corresponding sides of the body of the UAV symmetrical to a first vertical plane; and wherein, the charging station comprising:

a platform, and a power charge/supply module configured to charge electric power to the power charge/storage module; the power charge/supply module being equipped on the charging station and comprising a second positive electrode and a second negative electrode; wherein, when the UAV is parked on the platform, and the first positive electrode and the first negative electrode contact with the second positive electrode and the second negative electrode correspondingly, the power charge/supply module conducts to charge the power charge/storage module through the first positive electrode, the first negative electrode, the second positive electrode and the second negative electrode; wherein, the power charge/supply module comprising a sliding drive assembly, a first movable seat and a second movable seat; the first movable seat and the second movable seat are respectively provided with a first V-shaped guide plate and a second V-shaped guide plate; the first V-shaped guide plate and the second V-shaped guide plate are respectively located above the platform symmetrically to a second vertical plane; the second positive electrode and the second negative electrode being respectively arranged on the first V-shaped guide plate and the second V-shaped guide plate symmetrical to the second vertical plane, and being respectively located on angle bisectors of the first V-shaped guide plate and the second V-shaped guide plate; the sliding drive assembly being configured to drive the first movable seat and the second movable seat to move relatively between a first position and a second position; wherein, when the UAV is parked on the platform, and the first movable seat and the second movable seat are relatively in the first position, the first positive electrode and the first negative electrode are respectively separated from the second positive electrode and the second negative electrode; wherein, when the first movable seat and the second movable seat move relatively from the first position to the second position, the first V-shaped guide plate and the second V-shaped guide plate respectively push the first leg frame and the second leg frame until the first vertical plane coincides with the second vertical plane, the first positive electrode and the first negative electrode are in corresponding contact with the second positive electrode and the second negative electrode, so that the power charge/supply module can charge and supply power to the power charge/storage module through the first positive electrode, the first negative electrode, the second positive electrode and the second negative electrode.

2. The unmanned aerial vehicle system as claimed in claim 1, wherein the plurality of obstacle avoidance sensors are six laser rangefinders; the first leg frame includes a first bottom bar and a first bracket connected to a middle section of the bottom bar; the second leg frame includes a second bottom bar and a second bracket connected to a middle section of the second bottom bar; two front ends and two rear ends of the first bottom bar and the second bottom bar are respectively extended with a bending bar; the corresponding bending bars of the first bottom bar and the second bottom bar directing to each other when the first leg frame and the second leg frame serve as the anti-collision frame; two laser rangefinders are correspondingly arranged on the bending bars at the front ends of the first leg frame and the second leg frame for sensing obstacles in a front space of the UAV; two laser rangefinders are correspondingly arranged on the bending bars at the rear ends of the first leg frame and the second leg frame for sensing obstacles in a rear space of the UAV; two laser rangefinders are correspondingly arranged on middle sections of the first bracket and the second bracket for sensing obstacles in two lateral spaces of the UAV.

3. The unmanned aerial vehicle system as claimed in claim 2, wherein, the body is extended downward with two straight rods; the electric driving mechanism includes a linear telescopic actuator, two upper limiters respectively arranged on the body, two lower limiters disposed on the two straight rods correspondingly, and two bifurcated bars are extended from an upper section of the first bracket and the second bracket correspondingly, and distal ends of the two bifurcated bars are pivotally connected to two ends of the linear telescopic actuator correspondingly; wherein, when the linear telescopic actuator performs an extension action, the two bifurcated bars are interacted to drive the first leg frame and the second leg frame to swing upward relative to the body, and when upper edges of top ends of the first bracket and the second bracket are against the two upper limiters correspondingly, the linear telescopic actuator stops the extension action; wherein, when the linear telescopic actuator performs a contraction action, the two bifurcated bars are interacted to drive the first leg frame and the second leg frame to swing downward relative to the body, and when lower edges of the top ends of the first bracket and the second bracket are against the two lower limiters correspondingly, the linear telescopic actuator stops the contraction action, so that the first leg frame and the second leg frame are used as the landing gear for the UAV.

4. The unmanned aerial vehicle system as claimed in claim 1, wherein the first leg frame includes a first bracket and a first bottom bar, a top end of the first bracket is connected to the UAV and a bottom end of the first bracket is connected to the first bottom bar; the second leg frame includes a second bracket and a second bottom bar, a top end of the second bracket connects the UAV and a bottom end of the second bracket connects the second bottom bar; the first bottom bar and the second bottom bar are parallel to each other for placing flatly on the platform; the first bracket and the second bracket are symmetrical to the first vertical plane; the first positive electrode and the first negative electrode are respectively arranged on the first bracket and the second bracket correspondingly; the second positive electrode and the second negative electrode are respectively arranged at corners of the first V-shaped guide plate and the second V-shaped guide plate correspondingly; wherein, when the first movable seat and the second movable seat move from the first position to the second position, the first V-shaped guide plate and the second V-shaped guide plate push the first bracket and the second bracket respectively; wherein, when the first movable seat and the second movable seat arrive at the second position, the corners of the first V-shaped guide plate and the second V-shaped guide plate contact the first bracket and the second bracket correspondingly, so that the first positive electrode and the first negative electrode are in contact with the second positive electrode and the second negative electrode correspondingly.

5. The unmanned aerial vehicle system as claimed in claim 1, wherein, the first positive electrode and the first negative electrode are respectively in arc-shaped; the second positive electrode and the second negative electrode respectively include a C-ring piece and two anti-C-ring pieces, the two anti-C-ring pieces are respectively bent outward from two ends of the C-ring pieces; wherein, when the two anti-C-ring pieces are pressed by an external force and expand outward relative to a center point of the C-ring piece, so that the C-ring piece has a restoring elasticity; wherein, when the first movable seat and the second movable seat move to the second position to produce the external force, the two anti-C-ring pieces of the second positive electrode and the second negative electrode are aligned and in contact with the arc-shaped first positive electrode and the first negative electrode by the external force.

6. The unmanned aerial vehicle system as claimed in claim 1, wherein the charging station includes a base, and the platform is arranged on a top of the base; the charging station includes a first sliding door and a second sliding door; the first sliding door and the second sliding door are pivotally arranged on the base and correspond to the platform; the sliding drive assembly drives the first movable seat and the second movable seat to move relatively between the first position and the second position, synchronously drives the first sliding door and the second sliding door to move relatively between a third position and a fourth position; wherein, when the first movable seat and the second movable seat move relatively to the first position, the first sliding door and the second sliding door are relatively moved to the third position to away from each other, so that upper space of the platform is in an open status for the UAV taking off and landing on the platform; wherein, when the first movable seat and the second movable seat relatively move to the second position, the first sliding door and the second sliding door are relatively moved to the fourth position to close each other, so that the upper space of the platform is in a closed status for shielding the UAV parked on the platform.

7. The unmanned aerial vehicle system as claimed in claim 6, wherein the first sliding door and the base are pivotally connected by a main linkage set and a secondary linkage set to form a four-bar linkage mechanism; the second sliding door and the base are pivotally connected by a main linkage set and a secondary linkage set to form a four-bar linkage mechanism; the first sliding door is provided with a quadrangular first top door and three first side doors ringed on three sides of the first top door; the second sliding door is provided with a quadrangular second top door and three second side doors ringed on three sides of the second top door; wherein, when the first sliding door and the second sliding door move to the fourth position, the upper space of the platform is covered by the first top door and the second top door, and the surrounding space of the platform is covered by the three first side doors and the three second side doors.

8. The unmanned aerial vehicle system as claimed in claim 7, wherein each main linkage set includes two main connecting rods positioned at two opposite sides of the first sliding door, the second sliding door and the base correspondingly; each secondary linkage set includes two secondary connecting rods positioned at two opposite sides of the first sliding door, the second sliding door and the base correspondingly; top ends of the main connecting rods are pivotally connected to the first sliding door and the second sliding door correspondingly; bottom ends of the main connecting rods are pivotally connected to the base correspondingly; top ends of the secondary connecting rods are pivotally connected to the first sliding door and the second sliding door correspondingly; bottom ends of the secondary connecting rods are pivotally connected to the base correspondingly; the bottom ends of the two main connecting rods of each main linkage set positioned at two opposite sides of the base are coaxially connected with a linkage bar; the bottom ends of the two secondary connecting rods of each secondary linkage set positioned at two opposite sides of the base are coaxially connected to a linkage bar; an accommodating space for accommodating the sliding drive assembly is disposed inside the base and under the platform; a groove communicating with the accommodating space extends laterally from a top surface of the platform; the sliding drive assembly includes a motor, a rotating shaft, a screw rod pivotally arranged on the two relative walls of the accommodating space and positioned above the rotating shaft, a linkage assembly, two nuts respectively and movably screwed on the screw rod, two worms respectively arranged on the rotating shaft in synchronous rotation status, and two worm gears correspondingly fixed on the linkage bars and engaged with the two worms oppositely; the first movable seat and the second movable seat are connected to the two nuts correspondingly; one end of the rotating shaft is connected with an output shaft of the motor, and the other end is pivotally connected with a wall of the accommodating space; the screw rod has two thread segments that are opposite to each other for the two nuts to be screwed together and moving in reverse; wherein, when the motor actuates the rotating shaft together with the two worms to rotate in clockwise direction, the two worms drive the two worm gears and the linkage bars to rotate forward, and the linkage bars drive the main connecting rods of the main linkage sets correspondingly, the main connecting rods respectively rotate with respect to the linkage bars as turning axes correspondingly, then to drive the first sliding door and the second sliding door to swing to the third position and interact the secondary connecting rods to auxiliary support the swings of the first sliding door and the second sliding door to the third position respectively; simultaneously, the linkage assembly is driven by the rotating shaft to interact the screw rod to rotate forward, so that the screw rod actuates the two nuts to move in opposite directions to interact the first movable seat and the second movable seat to move oppositely to each other to the first position; wherein, when the motor actuates the rotating shaft together with the two worm to rotate in counterclockwise direction, the two worm drives the two worm gears and the linkage bars to rotate backward, and the linkage bars drives the two main connecting rods of the two main linkage sets correspondingly, the main connecting rods respectively rotate with respect to the linkage bars as turning axes correspondingly, then to drive the first sliding door and the second sliding door to swing to the fourth position and interact the secondary connecting rods to auxiliary support the swings of the first sliding door and the second sliding door to the fourth position respectively; simultaneously, the linkage assembly is driven by the rotating shaft to interact the screw rod to rotate backward, so that the screw rod actuates the two nuts to move closely to each other to interact the first movable seat and the second movable seat to move closely to each other to the second position.

9. The unmanned aerial vehicle system as claimed in claim 6, wherein the charging station includes a solar charging module, the solar charging module includes a plurality of solar panels, and the plurality of solar panels are respectively arranged on the first sliding door and the second sliding door for receiving sunlight and converting the sunlight into electricity and saving the electricity in the power charge/supply module.

10. The unmanned aerial vehicle system as claimed in claim 1, wherein the charging station is provided with a power control module and a power sensing module configured to produce power sensing signals; the first signal processing module and the power control module are connected through a wireless communication module; the first signal processing module uses the power sensing signals from the power sensing module to continuously monitor a charging status of the power charge/storage module; wherein, when the charging status of the power charge/storage module is in a fully charged state, the wireless communication module transmits a control command to the power control module of the charging station, so that the power control module is configured to control the power charge/supply module to stop charging the power charge/storage module.

11. The unmanned aerial vehicle system as claimed in claim 1, further comprising a global positioning system module configured for generating position signals of the UAV, a first image recognition module built in the first signal processing module, a distance sensing module configured to sense distances between the UAV and the platform of the charging station to produce distance sensing signals and a first image capture device configured to capture platform images; the first signal processing module is configured to perform a parking/charging flight; wherein, when the parking/charging flight is performed, the first signal processing module generates parking/charging flight control commands for the flight control module controlling the UAV to fly to the charging station; wherein, when the UAV arrives at a position above the charging station, the first signal processing module activates the first image capture device to continuously capture images of the platform to obtain platform images, and activates the first image recognition module to continuously convert the distance sensing signals into corresponding distance values; the first image recognition module is configured to establish a platform image database, the platform image database is preset predict platform images, each predict platform image is divided into nine square grids, the nine square grids are arranged in a square array, a center of each grid is set with a gravity coordinate parameter, and one central grid of the nine grids is set as a target grid for the UAV arriving to land on the platform; the first image recognition module is configured to extract the features of the platform images, to remove backgrounds of the platform images to obtain foregrounds of the platform images, to substitute the foregrounds of the platform images into the platform image database to compare with the nine square grids of corresponding predict platform images, to calculate coordinates of gravity centers of the foregrounds of the platform images according to the corresponding gravity coordinate parameters of the nine square grids so as to obtain corresponding real-time coordinate information, and to proceed with a first judgment to judge whether one of the real-time coordinate information coincides with the corresponding coordinate parameter of the target grid or not; wherein, when the first judgment result is yes, the first image recognition module is configured to start the distance sensing module to produce real-time distance sensing signals so as to obtain real-time distance values, to proceed with a second judgment to judge whether one of the real-time distance values is 0 or close to 0 or not; wherein, when the second judgment result is not 0 or not close to 0, a corresponding correction parking/charging flight instruction is generated for the flight control module to make the UAV correcting the parking/charging flight control commands until the first and second judgments are both yes.

12. The unmanned aerial vehicle system as claimed in claim 1, wherein the UAV further includes a global positioning system module configured for generating position signals of the UAV, a first wireless signal transmission module and a vibration sensing module configured to sense vibration statuses of corresponding vibration sensing positions of the bridge; bridge inspection and flight parameters of the bridge inspection flights are built in the first signal processing module, and the position signals are converted into corresponding position information, and then the bridge inspection and flight parameters are output with corresponding inspection and flight commands, so that the flight control module according to the corresponding position information and the corresponding inspection and flight commands drive the UAV to perform the bridge inspection flights; wherein, when the UAV arrives at a position adjacent to one of the corresponding vibration sensing positions that preset on the bridge, the vibration sensing module senses the vibration status of the corresponding vibration sensing position of the bridge to generate corresponding vibration sensing signals which are converted into corresponding vibration values by the first signal processing module; the first signal processing module transmits the corresponding vibration values to a monitoring unit; the monitoring unit processes the vibration values, and when one of the corresponding vibration values is higher than a corresponding preset bridge vibration threshold, a corresponding warning signal representing overload is issued, and a warning module is configured to output the corresponding warning signal in an overload warning information.

13. The unmanned aerial vehicle system as claimed in claim 1, wherein the UAV includes a global positioning system module configured for generating position signals of the UAV, a first wireless signal transmission module, a wireless communication module and a monitoring unit; bridge inspection and flight parameters of the bridge inspection flights are built in the first signal processing module; the first signal processing module converts the position signals into corresponding position information, and converts the bridge inspection and flight parameters into corresponding inspection and flight commands, so that the flight control module drives the UAV to perform corresponding bridge inspection flights according to the corresponding position information and the corresponding inspection and flight commands; at least one bridge status sensing unit senses the status of the bridge to generate bridge status sensing signals; at least one second signal processing module is set on at least one information transmission point of the bridge; and the at least one second signal processing module is configured to convert and process the bridge status sensing signals into corresponding bridge status data, and to collect and record the bridge status data in a memory module; the bridge status data recorded in the memory module are transmitted by a second wireless signal transmission module; wherein, when the UAV arrives at a position adjacent to the information transmission point, the first signal processing module receives the bridge status data transmitted from the second signal processing module through the communication between the first wireless signal transmission module and the second wireless signal transmission module; wherein, when the UAV arrives at a position adjacent to the monitoring unit, the monitoring unit receives the bridge status data transmitted by the first signal processing module through the wireless communication module, calculates and analyzes the bridge status data along a time axis to produce corresponding bridge status values and corresponding bridge status estimation information; wherein, when one of the corresponding bridge status values is higher than a preset bridge warning threshold, a warning signal representing the critical status of the bridge is issued; a warning module is configured to output the warning signal in critical warning information of the bridge status with the corresponding bridge status estimation information.

14. The unmanned aerial vehicle system as claimed in claim 13, wherein the corresponding bridge status estimation information is selected from bridge bearing load estimation information, bridge vibration estimation information, bridge girder reinforcement status estimation information, bridge supporting rubber status estimation information, bridge shock absorber status estimation information, bridge traffic flow estimation information, and bridge structural soundness estimation information.

15. The unmanned aerial vehicle system as claimed in claim 13, wherein the number of the at least one bridge status sensing unit is plural, and the plurality of bridge status sensing units are arranged on a plurality of bridge decks of the bridge correspondingly, and the plurality of bridge status sensing units are selected from the group consist of strain gauge, tri-axial accelerometer and thermometer.

16. The unmanned aerial vehicle system as claimed in claim 13, wherein, the UAV further comprises a first image capture device configured to capture bridge images from a bottom of the bridge, the first signal processing module transmits the bridge images through the wireless communication module; the monitoring unit includes a second image recognition module and a bridge image feature database built with a plurality of bridge feature samples; the monitoring unit receives the bridge images through the wireless communication module; each of the bridge feature samples defines a bridge status estimation information; the second image recognition module is configured to extract bridge features from the bridge images, and to execute a bridge status identification step; wherein, when the bridge status identification step is executed, the second image recognition module sequentially inputs the bridge features into the bridge feature database to predict a coincidence probability between the bridge features and the bridge feature samples, and when the coincidence probability is greater than a preset probability, then output the corresponding bridge status estimation information.

17. The unmanned aerial vehicle system as claimed in claim 13, wherein the bridge inspection and flight parameters are obtained by a preset inspection and flight schedule; the UAV is controlled according to the preset inspection and flight schedule to fly along a flight path and reach to multiple inspection information catching points in sequence; the bridge inspection and flight parameters comprise serial numbers, coordinate parameters of the multiple inspection information catching points, and arrival times of the UAV arriving at each of the multiple inspection information catching points.

18. The unmanned aerial vehicle system as claimed in claim 17, further comprising a first image capture device equipped on the UAV and configured to continuously capture bridge image, and an information display device equipped on the monitoring unit; the information display device is configured to receive the bridge image; the wireless communication module is configured for wirelessly linking the information display device to the first signal processing module equipped on the UAV; wherein when the UAV flies according to the preset inspection and flight schedule, the first image capture device continuously captures the bridge image so that the information display device displays the bridge image on a touch interface of the information display device; wherein, when the UAV arrives at a shooting position, the touch interface may be pressed by a user to actuate the first signal processing module to proceed with a real-time shooting procedure to produce a stop control signal and a shoot control signal, so that the flight control module controls the UAV to stop at the shooting position and the first image capture device shoots the bridge image at the shooting position, and the monitoring unit receives and records the bridge image and coordination parameter of the shooting position; wherein, when the real-time shooting procedure is finished, the flight control module controls the UAV keeping subsequent flights of the preset inspection and flight schedule.

\* \* \* \* \*